US008483465B2

(12) United States Patent
Mori

(10) Patent No.: US 8,483,465 B2
(45) Date of Patent: Jul. 9, 2013

(54) X-RAY IMAGE PROCESSING METHOD AND X-RAY IMAGE PROCESSING SYSTEM USING OPEN CURVE FOURIER DESCRIPTORS

(75) Inventor: Koji Mori, Yamaguchi (JP)

(73) Assignee: Yamaguchi University, Yamaguchi (JP)

( * ) Notice: Subject to any disclaimer, the term of this patent is extended or adjusted under 35 U.S.C. 154(b) by 431 days.

(21) Appl. No.: 12/936,521

(22) PCT Filed: Apr. 7, 2009

(86) PCT No.: PCT/JP2009/057100
§ 371 (c)(1),
(2), (4) Date: Dec. 23, 2010

(87) PCT Pub. No.: WO2009/125755
PCT Pub. Date: Oct. 15, 2009

(65) Prior Publication Data
US 2011/0091089 A1    Apr. 21, 2011

(30) Foreign Application Priority Data
Apr. 8, 2008    (JP) .................................. 2008-100173

(51) Int. Cl.
*G06K 9/00* (2006.01)
(52) U.S. Cl.
USPC ........................................................ 382/131
(58) Field of Classification Search
None
See application file for complete search history.

(56) References Cited

U.S. PATENT DOCUMENTS

| 7,177,480 B2* | 2/2007 | Ikeda et al. | 382/259 |
| 2010/0111395 A1* | 5/2010 | Tamakoshi | 382/132 |
| 2012/0093377 A1* | 4/2012 | Tsougarakis et al. | 382/128 |

FOREIGN PATENT DOCUMENTS

| JP | 07-105372 A | 4/1995 |
| JP | 2004-132767 A | 4/2004 |
| JP | 2006-212294 A | 8/2006 |
| JP | 2006-285627 A | 10/2006 |

OTHER PUBLICATIONS

Wallace, Timothy et al., Analysis of three-dimensional movement using fourier descriptors, IEEE Transactions on Pattern Analysis and Machine Intelligence, vol. PAMI-2, No. 6, 583-588,1980.

(Continued)

*Primary Examiner* — Claire X Wang
(74) *Attorney, Agent, or Firm* — Rabin & Berdo, P.C.

(57) ABSTRACT

3D position and attitude can be estimated in a short calculation time based on 2D projection image of an object such as an artificial joint bone or a living tissue bone when a part of the contour of the object in the 2D projection image cannot be discriminated due to a deficient part of the contour or noise. An X-ray image processing method of estimating position and attitude of a measuring object by comparing the measuring object on an X-ray projection image with a parent database storing data of a plurality of candidate objects is provided. The 3D shape of the candidate object is known, and the parent database stores an element-contour group of a plurality of candidate objects projected on 2D plane from various angles. An element-contour corresponding to the contour of said measuring object and a candidate object corresponding to the measuring object are estimated by comparing coefficient of open curve Fourier descriptors of contour of the measuring object with coefficient of open curve Fourier descriptors of each element-contour of the element-contour group, and position and attitude of the measuring object are calculated based on the element-contour corresponding to the contour of the measuring object and the candidate object corresponding to the measuring object.

11 Claims, 39 Drawing Sheets

OTHER PUBLICATIONS

Hirokawa, Shunji et al., A 3D Kinematic Measurement of Knee Proshesis Using X-Ray Projection Images, Theory, Summary of the Algorithm, NII Electronic Library Service, No. 02-0713, col. 2, pp. 157-158.

Hirokawa, Shunji et al., A 3D Kinematic Measurement of Knee Prosthesis Using X-ray Projection Images (Countermeasure to the Overlap between Tibio-femoral Component Silhouettes), Overlap Measures, Curvature interpolation of the missing part of the contour, NII Electronic Library Service, No. 05-0427, pp. 171-172.

Zheng, Zeyu et al., "Quantitative Evaluation of Partial Shape Characteristics of Petal in Sacred Lotus Based on P-type Fourier Descriptors", Contour Extraction and Quantitave Description Based on P-type Fourier Descriptors, NII Electronic Library Service, Breeding Research 7, pp. 135-136, 2005.

* cited by examiner

No Filter    m=50    m=30    m=10

* With reference to half-crouching position

Contour of thighbone
Enlarged view
Contour X
Contour of ossa cruris

Extended ──────────────▶ Bent

X-RAY IMAGE PROCESSING METHOD AND X-RAY IMAGE PROCESSING SYSTEM USING OPEN CURVE FOURIER DESCRIPTORS

FIELD OF THE INVENTION

The present invention relates to a technology measuring the position and attitude of a measuring object by comparing a contour of X-ray projection image of the object to a contour of a known candidate object. In particular, an artificial joint bone or a living tissue bone after a medical operation may be preferably applied to the measuring object.

BACKGROUND OF THE INVENTION

A knee joint includes a femur bone, a tibial bone, and a patella, which are replaced by artificial materials such as ultra-high-molecular polyethylene or titanium alloy when an osteoarthritis of the knee, etc. is contracted. These replacing parts are referred to as a femur bone component, a tibial bone component, a patella component, or the like. A patella may not be replaced by the component depending on doctor's diagnosis.

A load, which is several times larger than body weight, is exerted on a knee joint when walking, etc. Accordingly, if each of the components constituting the artificial knee joint is not properly aligned, the load concentration on the specific parts, etc. may cause problems such as shortening the life of artificial knee joint and preventing a smooth walking.

As such, a quantitative assessment of therapeutic effect may be made if it is possible to recognize and assess after an artificial joint replacement that the artificial joint replacement has been made with a proper alignment. Generally, medical appliance embedded in a living body is formed in a smooth shape without an edge point or the like so as to mitigate an aggressive character against a living tissue. This is true for a hard tissue such as bone in a living body, too.

X-ray photography is practically used for the assessment. It is known that accuracy is improved by using an image analysis, etc. without making visual evaluations on X-ray images.

However, an artificial joint embedded in a living body and surrounding bones being formed with smoothly curved surfaces as described above, it is not easy to estimate their position and attitude by recognition of change in locations of the identified feature points.

Non-patent literature 1 shows a simple and a high-accuracy method, which enables to estimate a 3D position and attitude based on a single X-ray image by pattern matching using Fourier descriptors. The pattern matching using Fourier descriptors is used in various fields. That is, the contour, which is made by projecting an object onto a 2D plane, is divided by nodes. And, the numerical sequence made by coordinates of the nodes is compared to that of the contours that are preliminarily photographed under various conditions. The contour of the object, which coincides with the condition, is found by mathematical procedures, and thus the condition of the object is estimated. As such, the pattern matching using Fourier descriptors is practically used as a method of estimating 3D position and attitude of an object including smoothly curved surfaces such as medical appliance embedded in a living body or surrounding hard tissues. Fourier descriptors, especially those using closed curved lines, can be conveniently used for comparison regardless of size, position of the center of gravity or direction of the obtained contour during the process of normalization.

Prior art is described hereinafter.

Patent literature 1 shows a method of estimating a distance between an X-ray source and the photographed artificial joint of a patient with reference to contours of X-ray images preliminarily photographed in various distances, making use of the fact that the contour of artificial joint in X-ray 2D image is varied depending on the distance between an X-ray source and an artificial joint. According to this method, the distance between the X-ray source and the artificial joint may be estimated, but the attitude of the artificial joint cannot be estimated. Further, since the overall contour of the photographed object (artificial joint) is used, the distance cannot be estimated if a part of the contour is deficient or unclear.

Patent literature 2 shows an image processing device in which a matching is performed between 3D shape data of bone and 2D X-ray images. Feature points called "bone's axis" are manually defined in 3D shape data of bone to produce their 2D projection images. Then, a projection location is determined such that displacement between the locations of the above images and those of feature points in 2D X-ray images is reduced to minimum, and thus the location of bone, etc. can be estimated. Since it includes a calculation part of virtual projection images, projecting 3D shape data onto 2D plane, calculation is required each time the location is estimated. However, the computing speed is limited. Further, since bone's axis is defined manually, it is difficult to define bone's axis for an object including smoothly curved surfaces without projections, etc., and thus the location estimation cannot be performed.

Patent literature 3 shows a method of retrieving similar 3D models based on 2D sketch images by preparing a contour database for 3D models. Fourier descriptors are used for the above retrieval to express the 2D sketch images and the data of the contour database for 3D models. Since the sketch images are supposed to be expressed by closed curves, if a small gap exists due to hand-written lines, a closing preprocessing is performed to fill the gap and make closed curved lines before the retrieval. As such, if a part of the contour of the object is deficient or unclear, the estimation is impossible. Furthermore, since the retrieval is the subject matter of this reference, the estimation of the 3D position and attitude cannot be performed.

Patent literature 4 shows a method of recognizing a pattern by using a neural network even when a part of the contour of 2D images is deficient. However, since this reference does not include a database for contours, a database matching for contours, which is required to classify input image patterns into one of preliminarily registered categories for discrimination of the position and attitude, cannot be performed. And thus, the estimation of the position and attitude cannot be performed.

Non-patent literature 1 shows a method of estimating a position and attitude of an artificial joint based on X-ray images using closed curve Fourier descriptors. Also, non-patent literature 2 shows an example using a similar method. In these technologies, numerical sequences for contours of an object to be photographed with variously different attitudes are preliminarily prepared and accumulated in a database in the form of closed curve Fourier descriptors. Contours of an object photographed in any attitude, which are expressed in the form of closed curve Fourier descriptors, are compared to data stored in a database, and thereby contours on the database, with the least errors, are selected. As such, an angle of the object photographed in any attitude is recognized (the same attitude as the selected contour on the database is recognized). Since nothing but comparison is implemented with numerical sequence data preliminarily stored in the database, 3D position and attitude can be advantageously estimated in a short calculation time. However, these technologies employing closed curve Fourier descriptors, the distance cannot be estimated if a part of the contour of a photographed object is deficient or unclear.

PRIOR ART

Patent Literature

Patent literature 1: laid-open patent publication No. 2004-132767.
Patent literature 2: laid-open patent publication No. 2006-212294.
Patent literature 3: laid-open patent publication No. 2006-285627.
Patent literature 4: laid-open patent publication No. 7-105372

Non-Patent Literature

Non-patent literature 1: Shunji Hirokawa and three others Research on estimation of 3D position and attitude of artificial knee joint based on X-ray end face projection image, Japan Society of Mechanical Engineers (JSME) Collection of papers, Title C, Vol. 69, No. 679, 713-720, 2003.
Non-patent literature 2: Wallace, P. T. and another, Analysis of three-dimensional movement using Fourier descriptors, IEEE Transaction s on Pattern Analysis and Machine Intelligence, Vol. PAMI-2, No. 6, 583-588, 1980.

SUMMARY OF THE INVENTION

Problems to be Solved by the Invention

According to conventional technologies, it is required that contours of an object be expressed in closed curved lines and the overall contour be reliable. Accordingly, if a part of the contours is overlapped with other objects or unclear, the position and attitude of the object cannot be properly estimated. When these technologies are applied to assessment of artificial knee joint replacement, the estimation on the position and attitude is difficult because a patella component in particular is frequently X-ray photographed partially overlapped with a femur bone component. Therefore, the inventors of the present application created a method and a system, which enable to perform a pattern matching making use of the advantages of closed curve Fourier descriptors even when a part of contour of an object such as patella is partially overlapped or unclear.

An object of the present invention is to provide a method and a system capable of estimating a 3D position and attitude in a short calculation time based on a 2D projection image of an object such as an artificial joint bone or a living tissue bone when a part of the contour of the object in the 2D projection image cannot be discriminated due to a deficient part of the contour or noise, etc.

Means for Solving the Problems

To achieve the above object the present invention includes the following configuration.

An X-ray image processing method of estimating a position and attitude of an measuring object by comparing the measuring object on an X-ray projection image with a parent database storing data of a plurality of candidate objects, and the measuring object is an artificial joint bone or a bone of living tissue, and
the 3D shape of the candidate object is known, and
the parent database stores an element-contour group of the plurality of candidate objects projected on 2D plane from various angles, and
a part of a contour of the measuring object is deficient, the method including:
a step of calculating a start point (point D) and an end point (point E) of the contour other than the deficient part of the measuring object;
a step of estimating a start point and an end point of each element-contour of the element-contour group corresponding to the start point and the end point of the contour of the measuring object;
a step of estimating an element-contour corresponding to the contour of the measuring object and a candidate object corresponding to the measuring object by comparing a coefficient of open curve Fourier descriptors calculated from the contour, the start point and the end point of the measuring object with a coefficient of open curve Fourier descriptors calculated from the contour, the start point and the end point of each element-contour of the element-contour group; and
a step of calculating a position and attitude of the measuring object based on the element-contour corresponding to the contour of the measuring object and the candidate object corresponding to the measuring object.

Further, the present invention includes the following configuration.

An X-ray image processing system for estimating a position and attitude of an measuring object by comparing the measuring object on an X-ray projection image with a parent database storing data of a plurality of candidate objects, and the measuring object is an artificial joint bone or a bone of living tissue, and
the 3D shape of the candidate object is known, and
the parent database stores an element-contour group of said plurality of candidate objects projected on 2D plane from various angles,
the system, including:
means for estimating an element-contour corresponding to the contour of the measuring object and a candidate object corresponding to the measuring object by comparing a coefficient of open curve Fourier descriptors of contour of the measuring object with a coefficient of open curve Fourier descriptors of each element-contour of the element-contour group; and
means for calculating a position and attitude of the measuring object based on the element-contour corresponding to the contour of the measuring object and the candidate object corresponding to the measuring object.

Further, the present invention includes the following preferable embodiments.

The X-ray image processing method further includes a step of eliminating from the element-contour group an element-contour with element-contour relative relations significantly different from measuring-object relative relations by comparing the measuring-object relative relations for a plurality of feature points of measuring object with the element-contour relative relations for a plurality feature points of element-contour based on a plurality of the measuring-object feature points introduced from the feature of contour of said measuring object and a plurality of element-contour feature points introduced from the feature of each element-contour of the element-contour group, corresponding to the measuring-object feature points before the step of estimating the start point and the end point is implemented.

At least one of the plurality of measuring-object feature points and the plurality of element-contour feature points is the most distant point from the longest axis of a contour that are obtained with respect to the contour of the measuring object and each element-contour of the element-contour group.

At least one of said plurality of measuring-object feature points and the plurality of element-contour feature points is on a skeletal line produced by skeletalization process that is applied to the contour of the measuring object and each element-contour of the element contour group.

The plurality of measuring-object feature points include at least the start point and the end point of contour, and the measuring-object relative relations are represented by a vector connecting one of a plurality of measuring-object feature points and the start point and the end point.

An element-contour corresponding to a contour of the measuring object and a candidate object corresponding to the measuring object is estimated by obtaining a plurality of open curved lines including as a start point and an end point any of a plurality of points on the contour of the measuring object and on each element-contour of the element-contour group, and comparing coefficients of Fourier descriptors of the plurality of open curved lines.

A part or whole of said each step is implemented in a remote location accessible via network.

A contour of the measuring object includes two or more deficient parts, the method further including,
a step of generating an open curved line with a start point and an end point by filling the gap of the deficient part and defining the curved line as a new contour of the measuring object.

At least one of the deficient parts of contour of the measuring object is a part eliminated due to proximity to other bones from the contour of the measuring object or a part outside of the X-ray projection image.

A part or whole of database and computing means is provided in a remote location accessible via network.

Advantageous Effect of the Invention

According to the present invention, with the above configurations adopted, the 3D position and attitude of a measuring object can be accurately estimated from X-ray projection image. In particular, even when a part of the contour is deficient due to the measuring object overlapped with other objects, it can be compared with the contour of known candidate objects by using open curve Fourier descriptors. If a measuring object can be identified as any one of the known candidate objects, the 3D position and attitude of the measuring object can be estimated. Information of start point and end point on the contour is required for open curve Fourier descriptors. According to the present invention, the start point and the end point on a candidate object can be estimated by using a vector connecting a point on the contour to the start point (point D) and the end point (point E) of a measuring object. Also, candidate objects can be narrowed down by using the vector, and thus the operation time required for the matching operation can be shortened.

Also, candidate objects can be narrowed down based on relative positions of two points at the intersection of the contour with the longest axis of the contour (points B and C) and the most distant point A from the longest axis on the contour between point B and point C, and thereby operation time required for matching operation can be shortened. Further, positions of points A to E on the contour being easily identified, a plurality of open curved lines of the contour are defined with any of these points as a start point and an end point. And, if coefficients of Fourier descriptors on the plurality of open curved lines are compared with each other, the contour of the measuring object and each-element contour of the candidate object can be compared with higher accuracy.

Furthermore, even if a plurality of bones constituting a joint are overlapped with each other in an X-ray image, or a part of the intended bone runs out of an X-ray image such that the contour line of bone is deficient at several places, candidate objects can be narrowed down by applying a skeletalization process in parallel, and thus the matching operation can be performed with higher accuracy at high speed.

DESCRIPTION OF THE PREFERRED EMBODIMENTS

Embodiment 1

Hereinafter, Embodiment 1 according to an embodiment of the present invention is described.

<Description of Fourier Descriptors>

First, Fourier descriptors are described. In particular, closed curve Fourier descriptors and open curve Fourier descriptors are described.

Fourier descriptors are used to describe features of a shape of an object by defining a contour shape of the object with complex number sequence a(n).

If the contour is defined by a single closed curve, a(n) is a periodic function, and thus the contour shape can be defined by Fourier series. A complex number sequence a(n), in which X-coordinate and Y-coordinate of nodes provided on a contour line represent a real part and an imaginary part respectively can be described with discrete Fourier series s(k) as shown in Formula 1.

$$s(k) = \sum_{n=-N/2+1}^{N/2} a(n) e^{-j(2\pi k n/N)} \quad -N/2+1 \le k \le N/2 \quad \text{[Formula 1]}$$

N: number of points on the contour

Comparison is made easily by using the same number of nodes with respect to different shapes so that features among shapes can be recognized quantitatively.

Fourier inverse transform is performed using Formula 2 based on the above Fourier coefficient s(k), and thus the shape can be restored (Formula 3). z represents point sequence of a contour shape reproduced by the inverse transform.

$$\hat{s} = \begin{pmatrix} s(k) & \dots & \left[k = 0, 1, \dots, \frac{N}{2}\right] \\ s(M+k) & \dots & \left[k = -\frac{N}{2}+1, \dots, -1\right] \end{pmatrix} \quad \text{[Formula 2]}$$

$$z(k) = \sum_{k=0}^{N-1} \hat{s}(k) e^{j\left(2\pi i \frac{jk}{N}\right)} \quad \text{[Formula 3]}$$

$$j = 0, \dots, N-1$$

N: number of points on the contour

It is generally known that when restoration of a shape based on Fourier inverse transform is performed, rounded shapes are restored deficient in data on an acute angle part if the inverse transform is performed with high frequency components eliminated.

Figure 1:
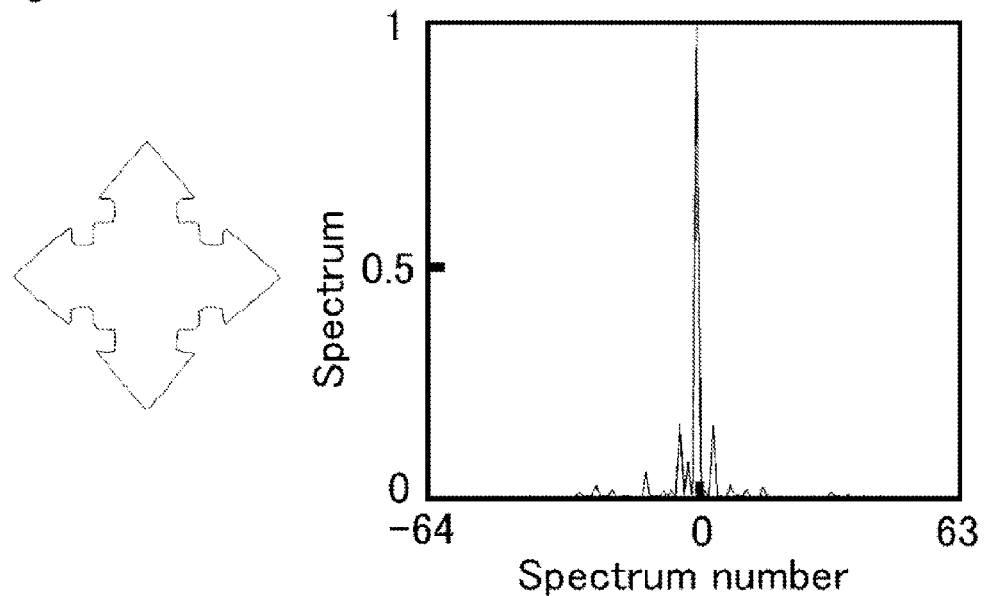
FIG. 1 is a view illustrating figures and frequency distributions when using closed curve Fourier descriptors.
Figure 2:
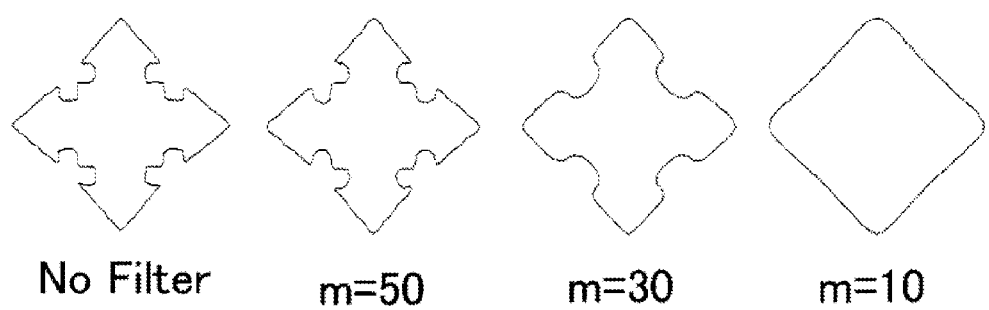
FIG. 2 is a view illustrating figures restored by eliminating components of the m-th or higher harmonic.

FIG. 2 shows restored curved lines of Figure A shown in FIG. 1 with the mth or higher harmonic components being eliminated by filtering. The reproduced curved lines are represented by Formula 3. As such, transform of figures is performed easily by using Fourier descriptors and features of figures can be quantified. Enlargement, contraction and rotation of figures and smoothing and sharpening of edges can be performed easily.

Next, open curved Fourier descriptors are described. Although open curved Fourier descriptors have several representation methods, P-type Fourier descriptors ("Fourier descriptors applied to open curves" written by Kousaka (Institute of Electronics, Information and Communication Engineers (IEICE), Journal, Vol. J67-A, No. 3, 166-173, 1984) is described here. A curved line is divided into N equal parts and approximated by polygons in a complex plane in which X-axis is defined as a real part and Y-axis is defined as an imaginary part. The length of each side of the polygon is represented by δL and i-th apex of polygon is described by complex function z(i)=x(i)+jy(i) (j: imaginary unit), where if c(k) is represented by $$c(k) = \frac{1}{N} \sum_{i=0}^{n-1} \frac{z(i+1) - z(i)}{\delta L} \exp\left(-2\pi j \frac{ik}{N}\right) \quad \text{[Formula 4]}$$

$$k = -N/2 + 1, \dots, N/2,$$

then features of the shape can be represented by open curve Fourier descriptors.

This P-type Fourier descriptors include following features: (1) they are applicable to both open curves and closed curves, (2) parallel translation, enlargement, contraction and rotation can be easily performed.

<Estimation on Position and Attitude of an Measuring Object Using Closed Curve Fourier Descriptors>

Estimation on the position and attitude of an measuring object using closed curve Fourier descriptors, which is prior art of the present invention, is described before describing estimation on the position and attitude of an measuring object using open curve Fourier descriptors. According to the present embodiment, an artificial patella is described as a measuring object.

Figure 3:
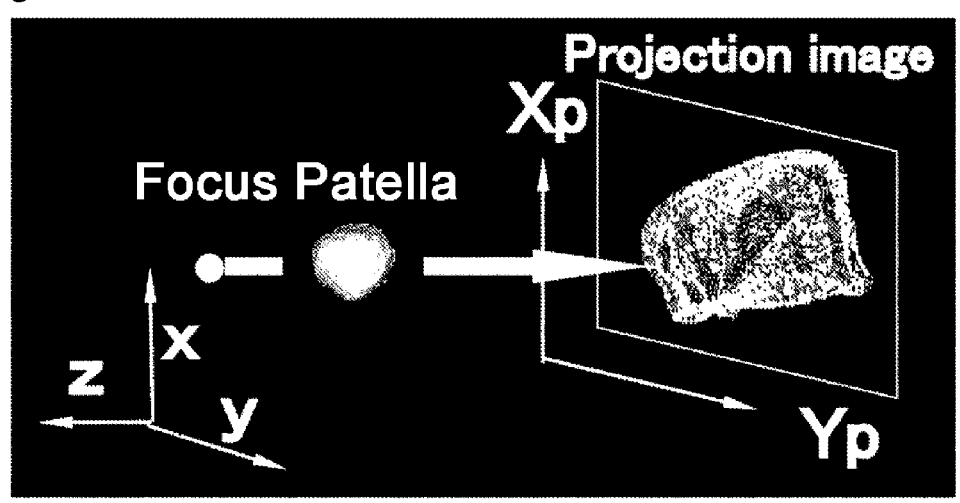
FIG. 3 is a view illustrating a frame format of a patella existing in a 3D space and its projection image on a 2D plane.

FIG. 3 shows that an object (patella) exists at a given position and attitude in a space defined by X Y Z coordinates. When defining the contour of an object on a projection plane, the contour shape is represented by Fourier descriptors s(k) by using Formula 1 with Xp-axis and Yp-axis defining a real axis and an imaginary axis respectively.

Fourier descriptors s(k) vary in various ways depending on the position, the size and the direction of the contour itself. However, Fourier descriptors, normalized with the position, the size and the attitude of the contour image itself, can be transformed to specific values of the contour shape of its own. For example, s(0) represents the centroid location of the contour and |s(1)| represents the side of the contour. By making use of this, the position of the contour can be normalized with s(0)=0 (Formula 5). Further, when Z-rotation of the contour is normalized, $$s(k)_{norm} = s1(k)e^{-j[\{(k-K)u+(1-k)v\}]/(K-1)}$$ [Formula 5]

u: phase of the largest coefficient s(1)
v: phase of the second largest coefficient s(k),
whereby the phase of s(k) can be normalized. In the case of a patella model according to the present embodiment, since direction is not fixed due to normalization, Z rotation is normalized further by using Formula 6.

$$s(k)_{norm} = s2(k)e^{j[(i-1)\pi i/K-1]}$$

$$s(1) \leq 0; S(k) = -S(k)$$

$$s(1) > 0; S(k) = S(k)$$ [Formula 6]

u: phase of the largest coefficient s(1)
v: phase of the second largest coefficient s(k).

Figure 4:
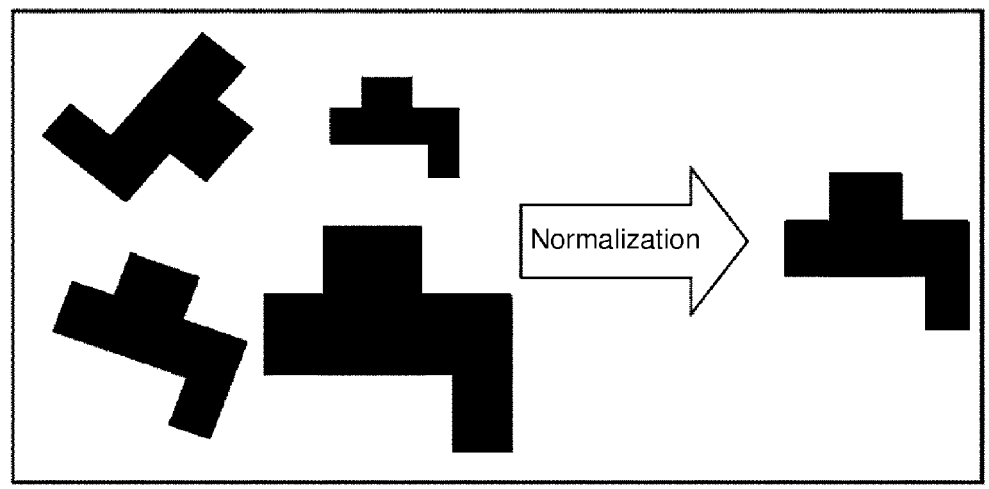
FIG. 4 is a view illustrating figures before normalization and a figure after normalization.

Normalization based on Formula 1, Formula 5 and Formula 6 can eliminate effect of translation and Z-axis rotation from s(k) (FIG. 4). S(k) represents a value after the above normalization is performed with respect to s(k). S(k) is called Normalized Fourier Descriptors (NFD) and used as a specific index featuring the contour shape.

Now, Normalized Fourier Descriptor $S(k)_{lib}$ eliminating effect of Z-axis rotation or effect of the contour due to parallel translation and change in size, it eventually represents change in contour shape depending only on X-axis and Y-axis rotations.

Figure 5:
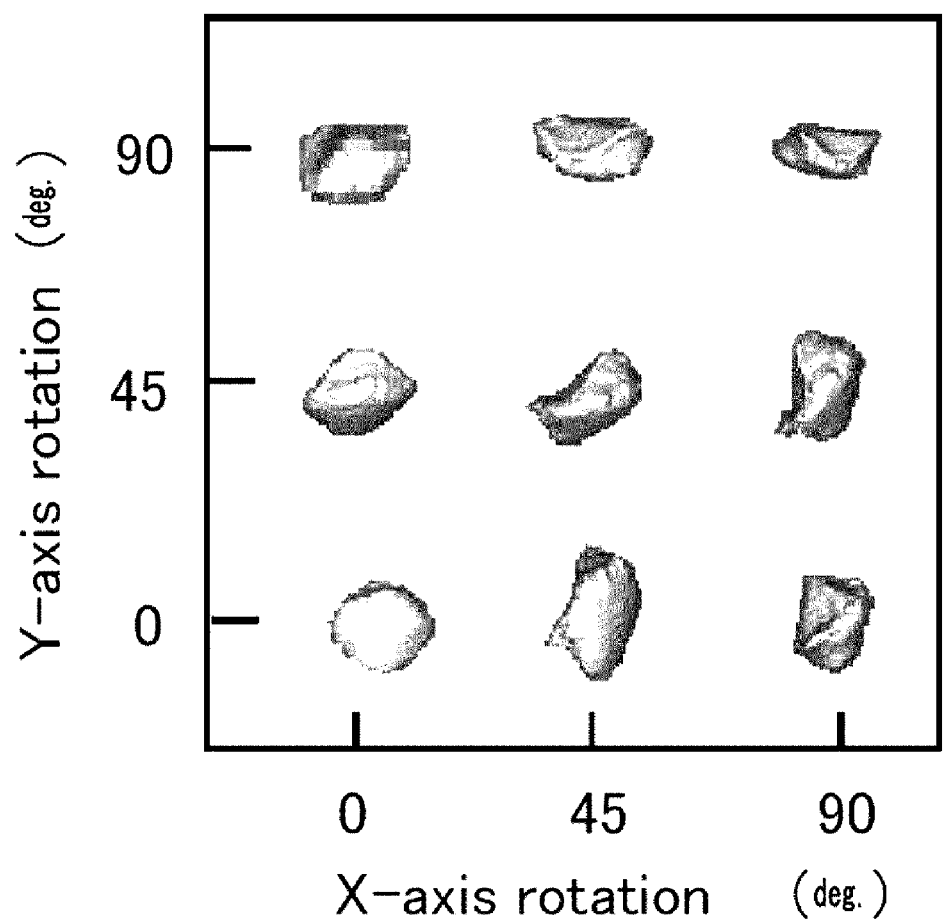
FIG. 5 is a view illustrating a frame format of a database of patella.

And, contour shape is stored each time the patella is rotated for a given angle around X-axis and Y-axis. This database is particularly called parent database, and its conceptual figure is shown in FIG. 5. As shown in FIG. 5, 3D shape of a measuring object, rebuilt by joining 2D data preliminarily photographed by CT, is projected on a 2D plane each time it is rotated around X-axis and Y-axis for a given angle. Images as shown in FIG. 5 are not actually stored in a computer. NFD value S(k) of the contour shape on the images and position, size and data related to Z-axis rotation obtained by normalization transform (hereinafter referred to as "element-contour") are stored in a database. Specific numbers are allocated to the element-contours stored in the database.

Next, a method of estimating a patella photographed at a given position and attitude based on element-contours stored in the database is described. A set of NFD values, S(k) based on the contour image of a patella projection figure with unknown position and attitude and data obtained through normalization is called "input image" hereinafter.

Figure 6:
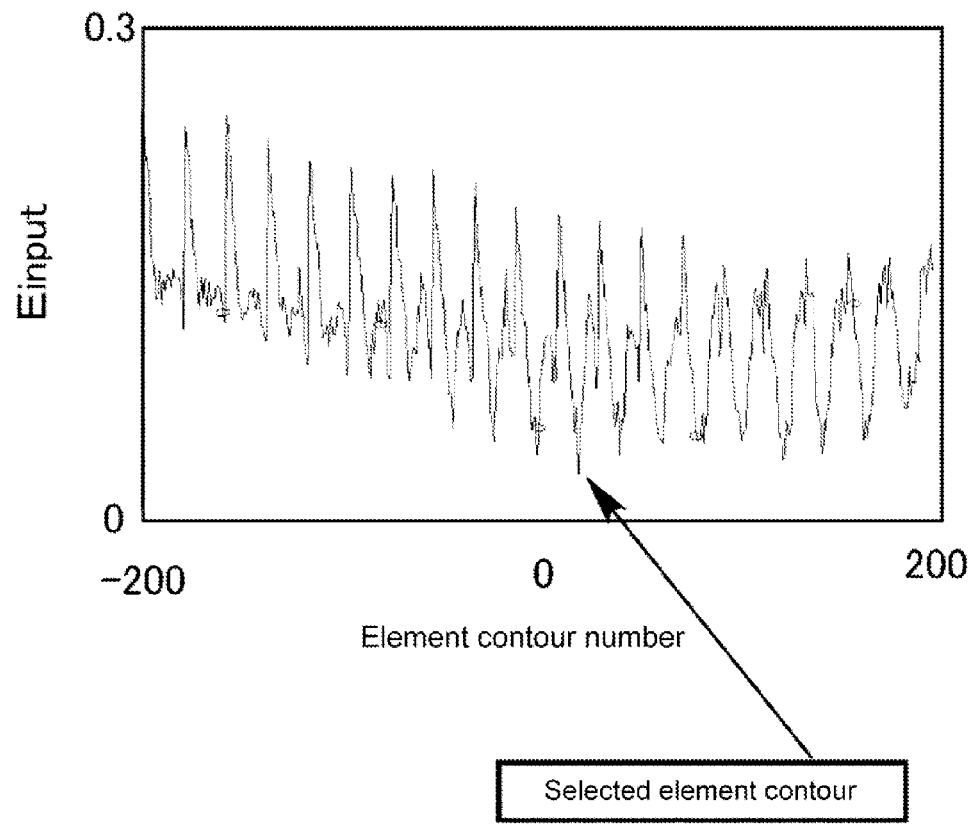
FIG. 6 is a view illustrating element-contours stored in the database and E_input.

Element data, which is the most similar to the contour shape of $S(k)_{input}$, is retrieved from the database. Specifically, an element-contour number is retrieved by using Formula 7 such that Euclidean distance (corresponding to error) is minimized between normalized Fourier descriptors $S(k)_{lib}$ based on each contour stored in the database and normalized Fourier descriptors $S(k)_{input}$ based on the input image (see FIG. 6).

$$E_{input} = \sum_{i=1}^{N} (S(k)_{input} - S(k)_{lib})^2$$ [Formula 7]

N: number of nodes on the contour

Z-axis rotation angle is estimated based on normalized data of the input image. Basically, each estimation value is obtained through comparison between the normalized data of the input image and normalized data of element-contour (index "select") selected from the database by Formula 7. As such, estimated values of X-axis, Y-axis and Z-axis rotation angles are represented as $\theta_{X\_est}$, $\theta_{Y\_est}$ and $\theta_{Z\_est}$ with an index "est" and calculated as follows:

$$\theta_{X\_est} = \theta_{X\_select}$$ [Formula 8]

$$\theta_{Y\_est} = \theta_{Y\_select}$$ [Formula 9]

$$\theta_{Z\_est} = \theta_{Z\_input} - \theta_{Z\_select}$$ [Formula 10]

Although estimated values of X-axis rotation angle and Y-axis rotation angle are the same as those of X-axis rotation angle and Y-axis rotation angle of contours selected from database, only the Z-axis rotation value is a difference between the normalized data $\theta_{Z\_input}$ related to Z-axis rotation angle of the input image and the normalized data $\theta_{Z\_select}$ related to Z-axis rotation angle of contours selected from the database.

Estimated values of the X-axis translation, the Y-axis translation and the Z-axis translation are represented by an index "est" and described as follows. Calculated based on parameters of Fourier descriptors.

$$X\_est = S\_X(0)_{input} - S\_X(0)_{select}$$ [Formula 11]

$$Y\_est = S\_Y(0)_{input} - S\_Y(0)_{select}$$ [Formula 12]

$$Z\_est = |S(1)_{select}|$$ [Formula 13]

As such, all the six degrees of freedom can be obtained. Here, S_X(0) and S_Y(0) stand for X component (real part) and Y component (imaginary part) of Fourier descriptor S(0) after normalization operations, respectively. According to the present embodiment, the distance between the X-ray source and the projection plane in the database being matched with that in the input image, the position can be estimated by using Formula 11 to Formula 13. Non-patent literature 1 shows a higher accurate method of estimating the position and attitude in consideration of apparent rotation angles, and Formulas enabling to estimate the position and attitude even when the distance between the X-ray source and the projection plane in the database is not matched with that in the input image. The above method and Formulas described in non-patent literature 1 may be used with regard to Formula 11 to Formula 13.

Figure 7:
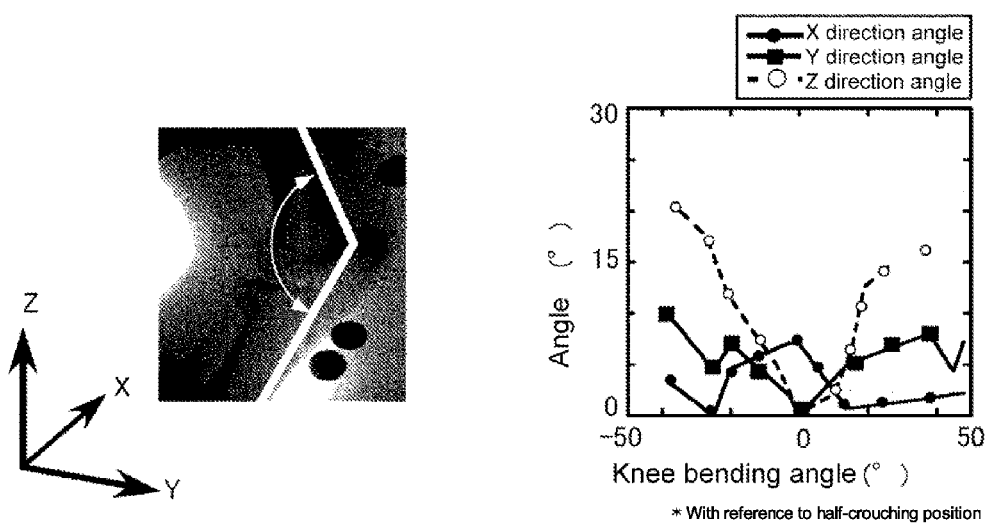
FIG. 7 is a view illustrating a coordinate system (left) and a graph of the knee bending angle and the angle of patella (right).
Figure 8:
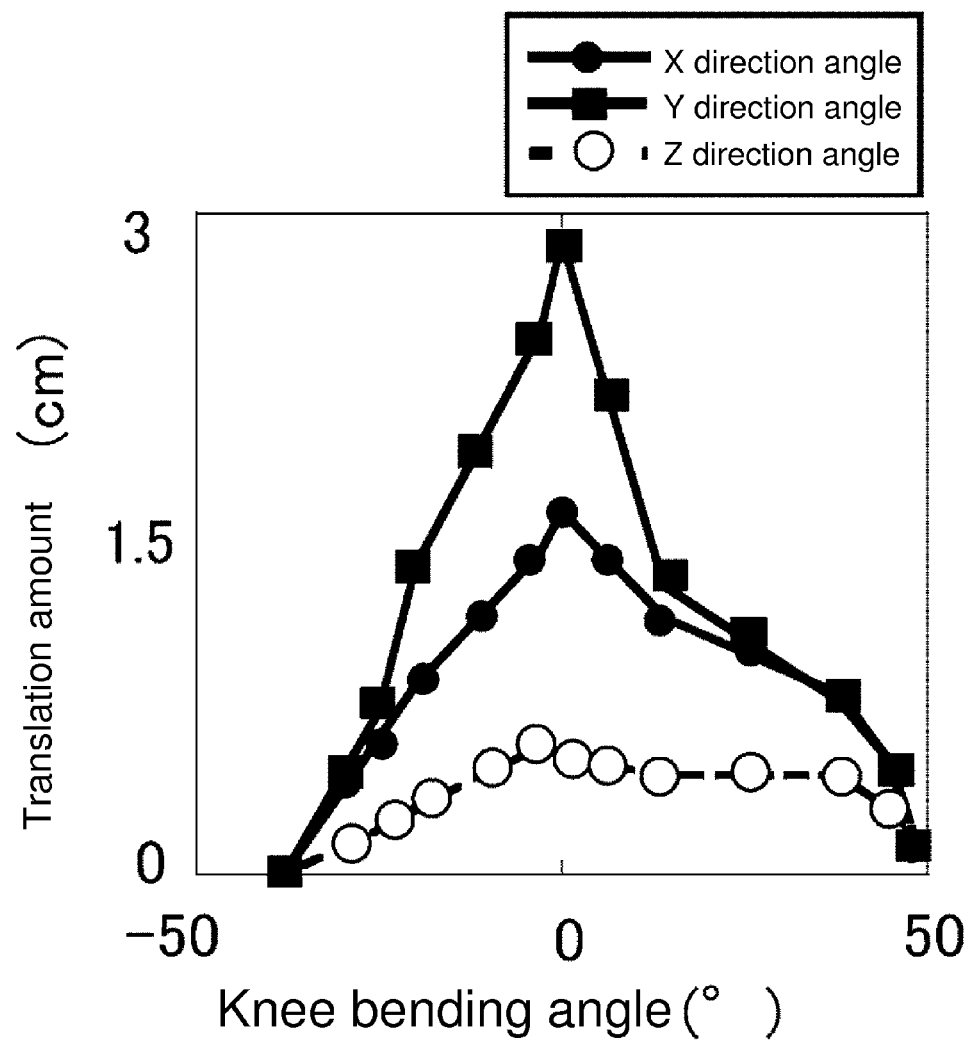
FIG. 8 is a view illustrating a graph of the knee bending angle and translation of patella.

By using this method, the position and attitude of patella can be estimated. FIG. 7 shows knee bending angles (note: with reference to half-crouching position) and rotation angles of patella in X, Y and Z-axis directions and FIG. 8 shows translation values in X, Y and Z directions, respectively, for a normal subject. Accuracy related to the attitude is approximately 1 degree, which is sufficient accurate for practical uses.

Figure 9:
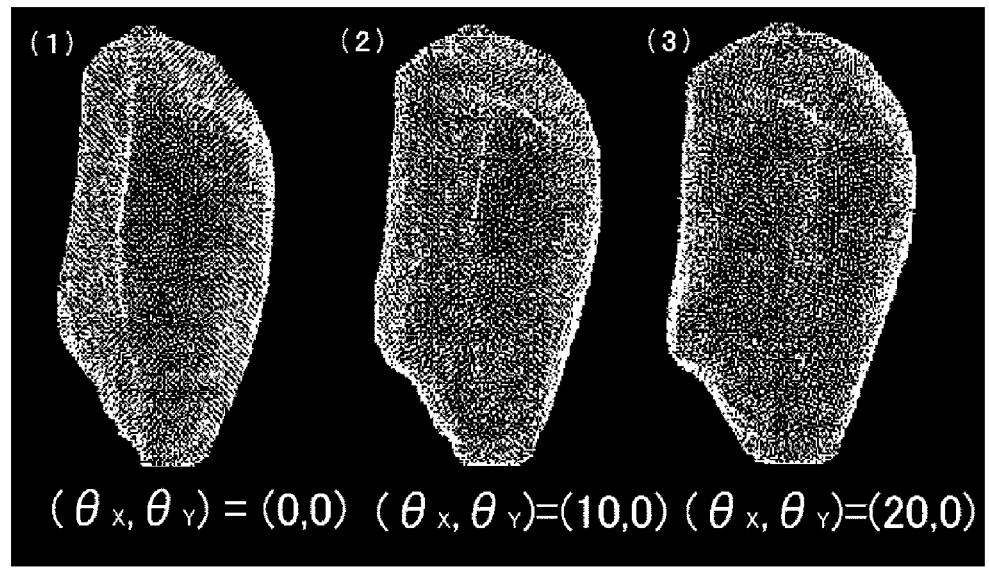
FIG. 9 is a view illustrating examples of an actual input image (patellae at different angles).
Figure 10:
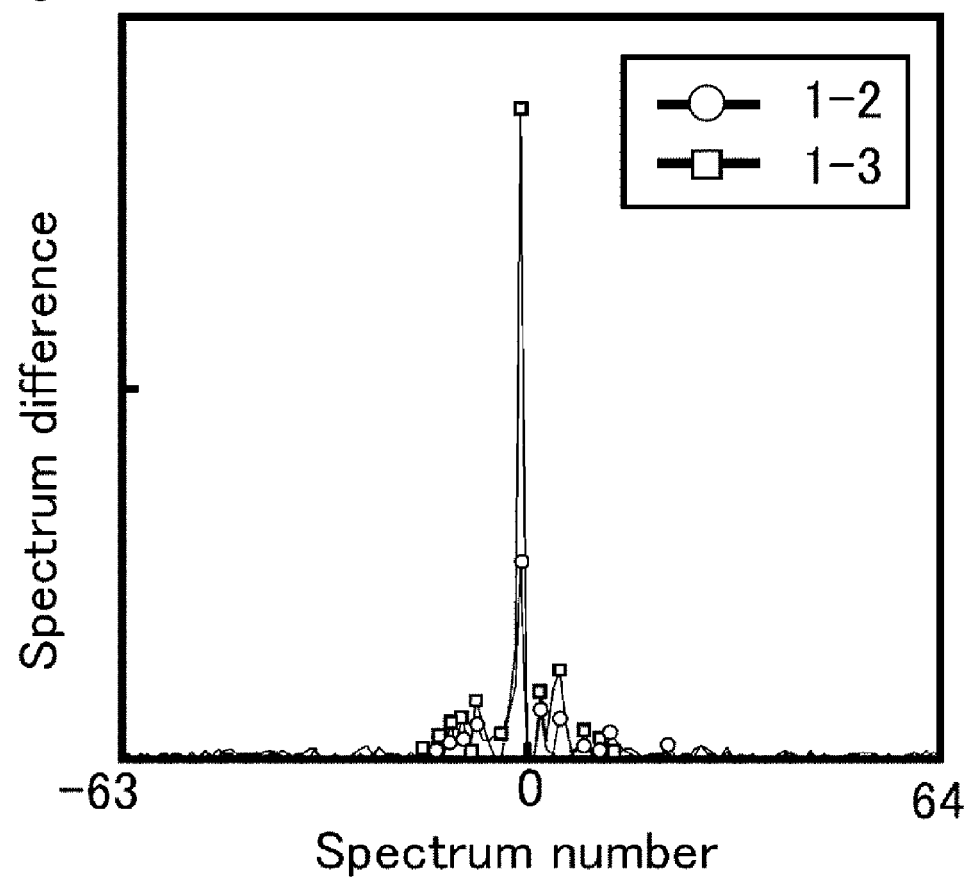
FIG. 10 is a view illustrating Fourier spectrum differences with respect to patellae in FIG. 9.
Figure 11:
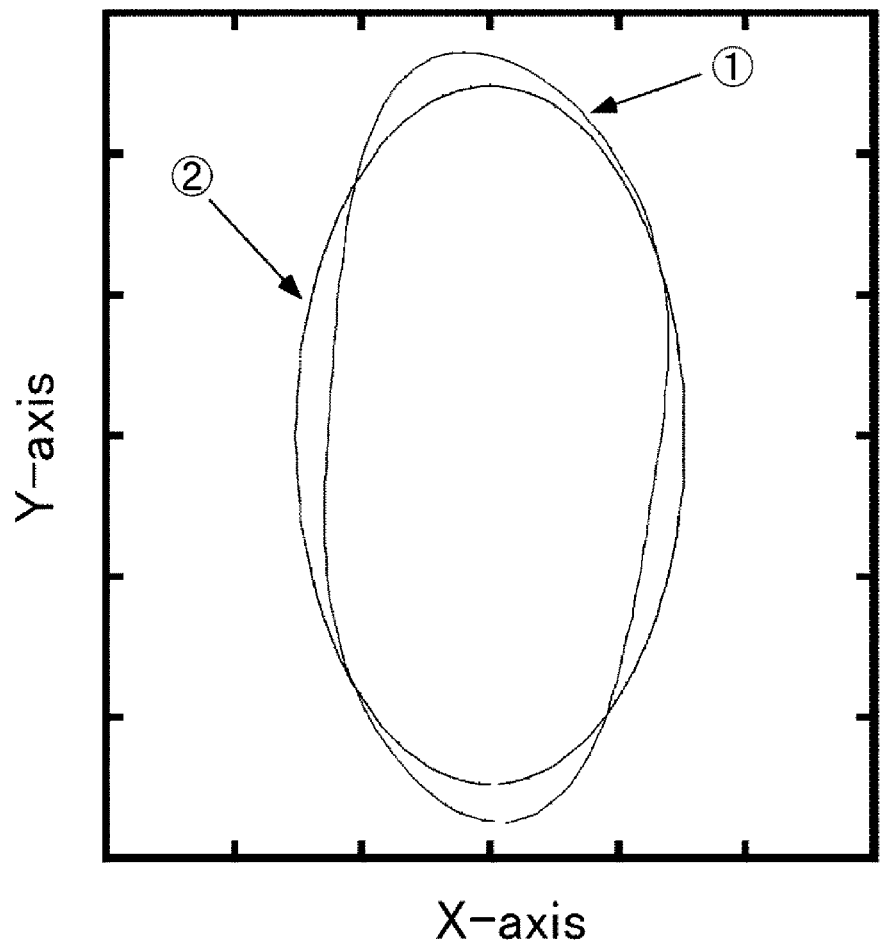
FIG. 11 is a view illustrating a patella restored by eliminating components the first or higher harmonic with respect to the patellae shown in FIGS. 9(1) and 9(2).

Estimations on the position and attitude of patella are shown in FIG. 9, while FIG. 10 shows the components of Fourier spectrum performing the estimations. The element of S(−1) is the largest when comparing spectrum differences between attitude 1 and attitude 2 and spectrum differences between attitude 1 and attitude 3. This was true for assessments by other attitudes. From this, it can be seen that S(−1) is the most significant element in the estimation on the position and attitude of patella. When an image defined only by S(−1) is restored through a filter making use of Formula 3 with respect to (1) and (2) in FIG. 9, it was found that the shape was close to ellipse as shown in FIG. 11. This showed that ellipse aspect ratio has an effect on estimate accuracy on position and attitude of patella.

<Estimation on Position and Attitude of Measuring Object Using Open Curve Fourier Descriptors>

Figure 12:
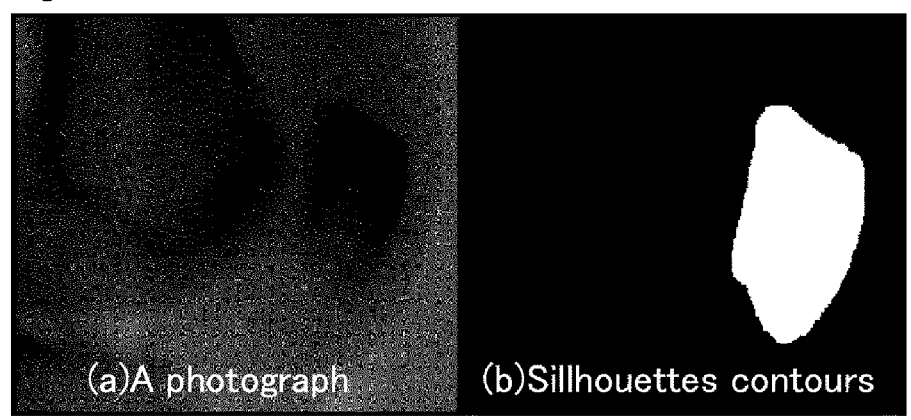
FIG. 12 is a view illustrating an input image (X-ray photograph (left)) used for estimation on position and attitude of a measuring object using closed curve Fourier descriptors and an image displaying only patella portion inverted (right).
Figure 13:
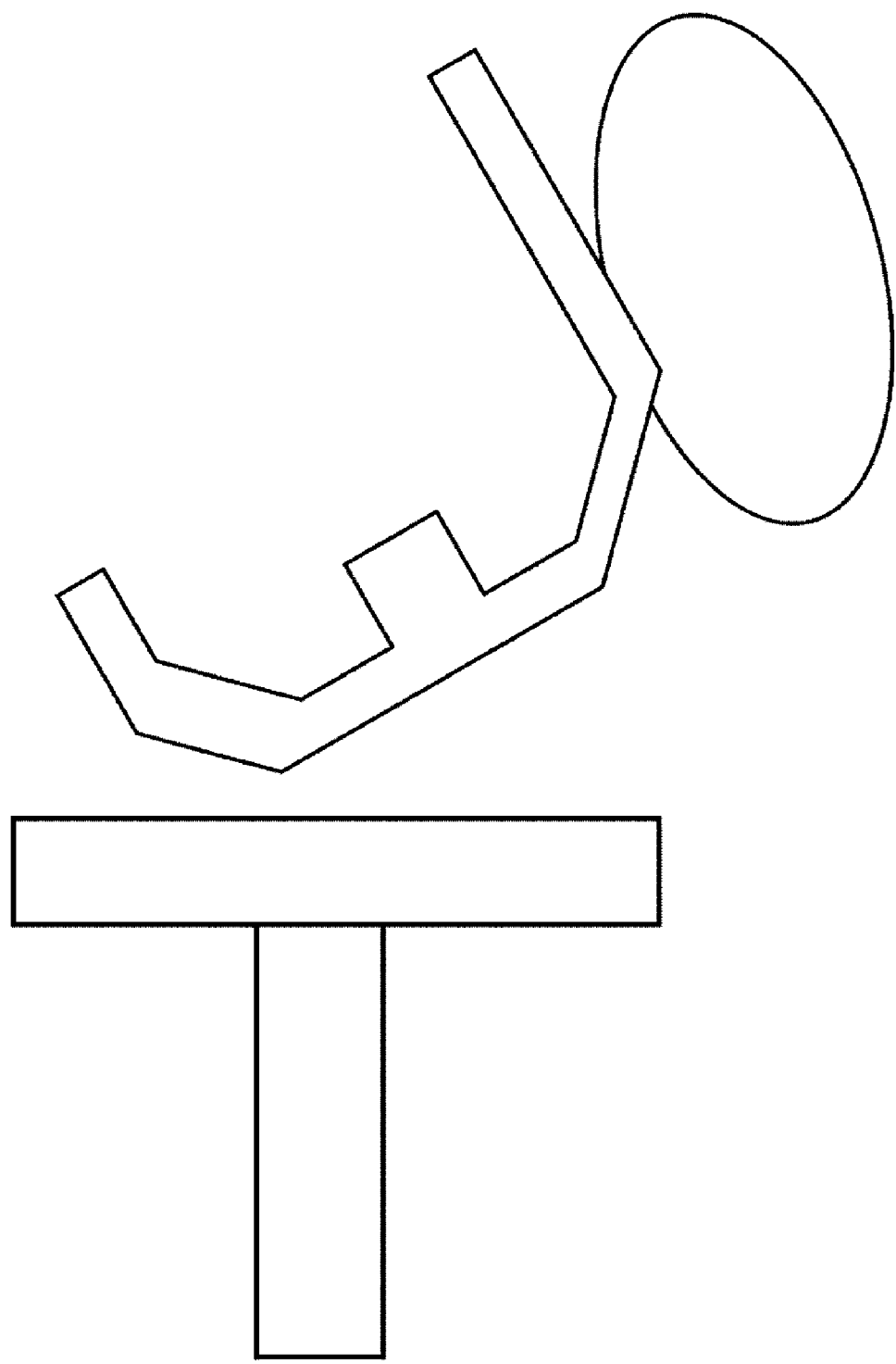
FIG. 13 is a frame format illustrating a positional relation of a femur bone component, a tibial bone component and a patella in a knee joint when they are X-ray photographed after an artificial joint replacement.

Since a knee joint image of a normal subject was employed as an input image in the above experiment, the patella was not overlapped by other parts as shown in FIG. 12, and thus the contour could be extracted. However, when an artificial joint replacement is performed, the patella (or patella component) and the femur bone component are overlapped as shown in FIG. 13, and thereby a part of the contour of the patella (or the patella component) cannot be recognized. As a result, a part of the contour of the patella (or the patella component) is not longer reliable and thus cannot be expressed by closed curved lines. Therefore, Formula 1, which is based on closed curved lines, cannot be used.

Meanwhile, open curve Fourier descriptors also exist. It is possible to describe a reliable part of the contour of the patella (or patella component) using open curve Fourier descriptors in an input image. However, the contours of the patella stored in a database are closed curved lines. When open curve Fourier descriptors are applied to these closed curved lines, innumerable combinations of start points and end points exist, and thus the number of candidates of open curve Fourier descriptors in the database that are matched with open curve Fourier descriptors in the input image is described by (number of database)×(number of candidate of start points)×(number of candidate of end points), thereby requiring a huge amount of calculation. Accordingly, a method of determining start points and end points is required for the contours in the databases in order to execute the above algorism in a realistic calculation time.

Figure 14:
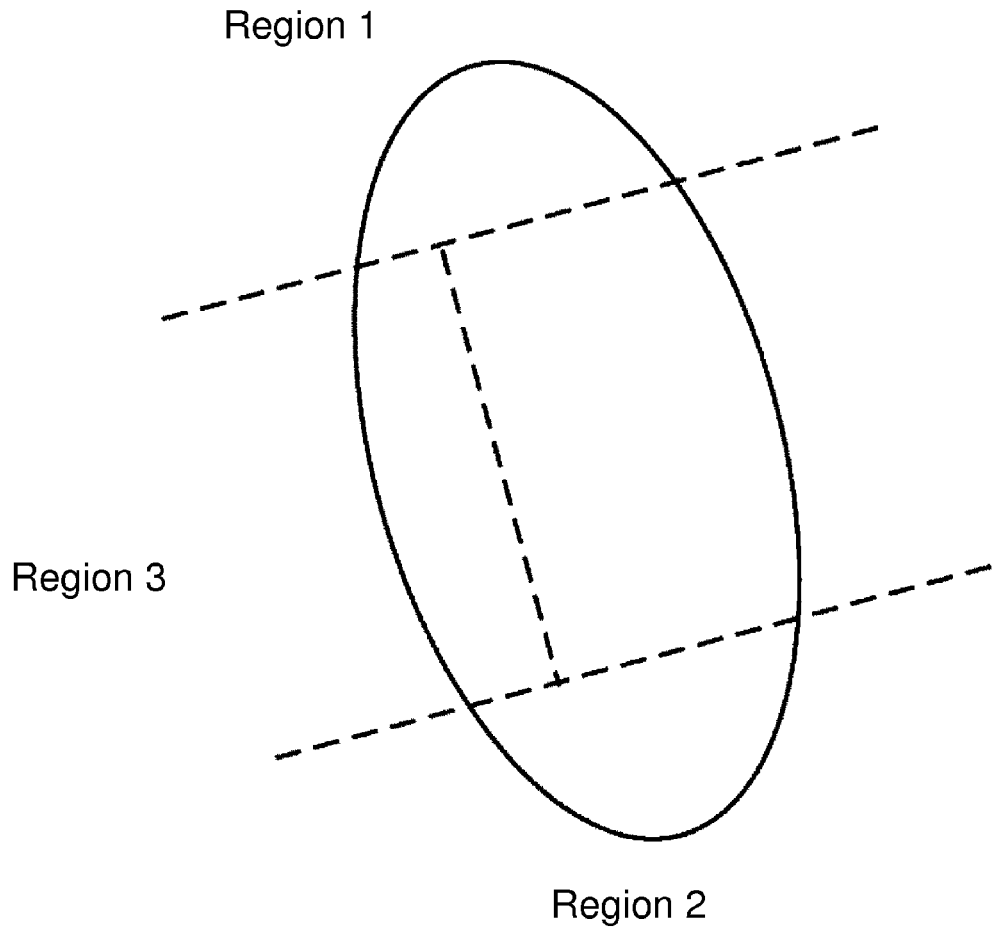
FIG. 14 is a view illustrating the contour of a patella divided into three regions.

While a part of the patella (or the patella component) is overlapped with a femur bone, a straight line was drawn to forcibly connect the overlapped part, and Fourier descriptors was described by using Formula 1 with the contour of patella (or patella component) as closed curved lines, and then the position and attitude was estimated. As shown in FIG. 14, the patella (or the patella component) is divided into three regions so that the areas overlapped with the femur bone component in each region (reproduced by linearly eliminating a part of the contour) are varied. In this case, the inventors of the present invention reviewed which element image was selected with respect to the input image photographed at given angles θX and θY.

Figure 15:
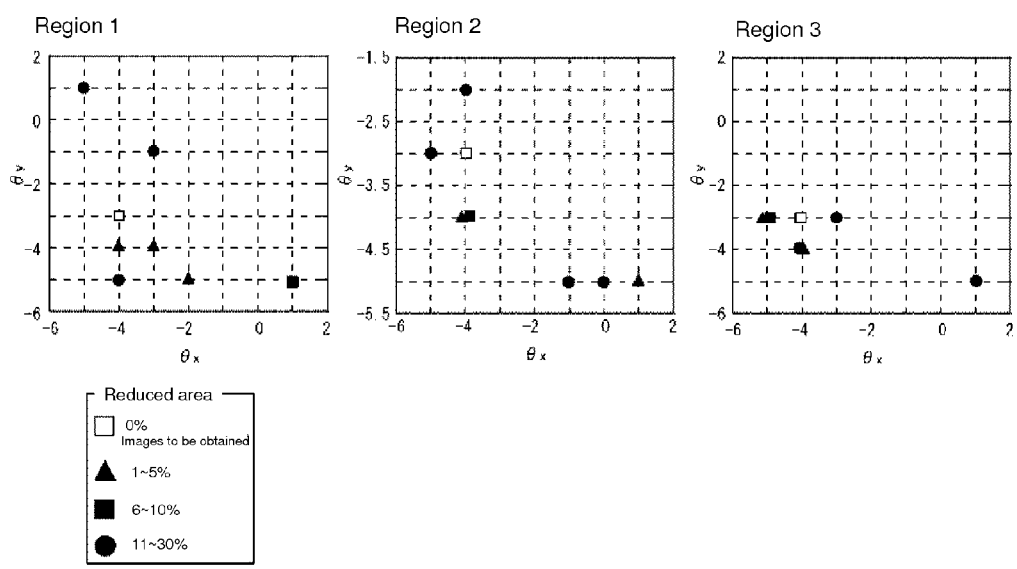
FIG. 15 is a view illustrating angles of selected element-contour when deficient parts exist in each of regions in the input image.

The results are shown in FIG. 15. θX and θY of the input image are −4 degrees and −3 degrees, respectively. It is found from FIG. 15 that if a deficient area (overlapped with the femur bone component) is increased in any regions, an element-contour different from θX and θY of the input image is selected. If the difference is regarded as an error due to the existence of the deficient region, it is found that the errors in regions 1 and 2 are large compared to region 3. Furthermore, it is found that the larger the deficient area is, the larger the error tends to be. From this, it is found that the curved line portions of region 1 and region 2 involve the estimate accuracy of the position and attitude of the patella (or the patella component).

From an experiment using a conventional method it has been found that:

1. Position and attitude of a patella approximated by an ellipse shape is estimated by change of the long radius and the short radius.
2. Change in curvatures of region 1 and region 2 has a significant effect on the estimate accuracy.
3. Comparison between databases and an input image by applying open curve Fourier descriptors is difficult unless a start point and an end point are determined in the databases.

Figure 16:
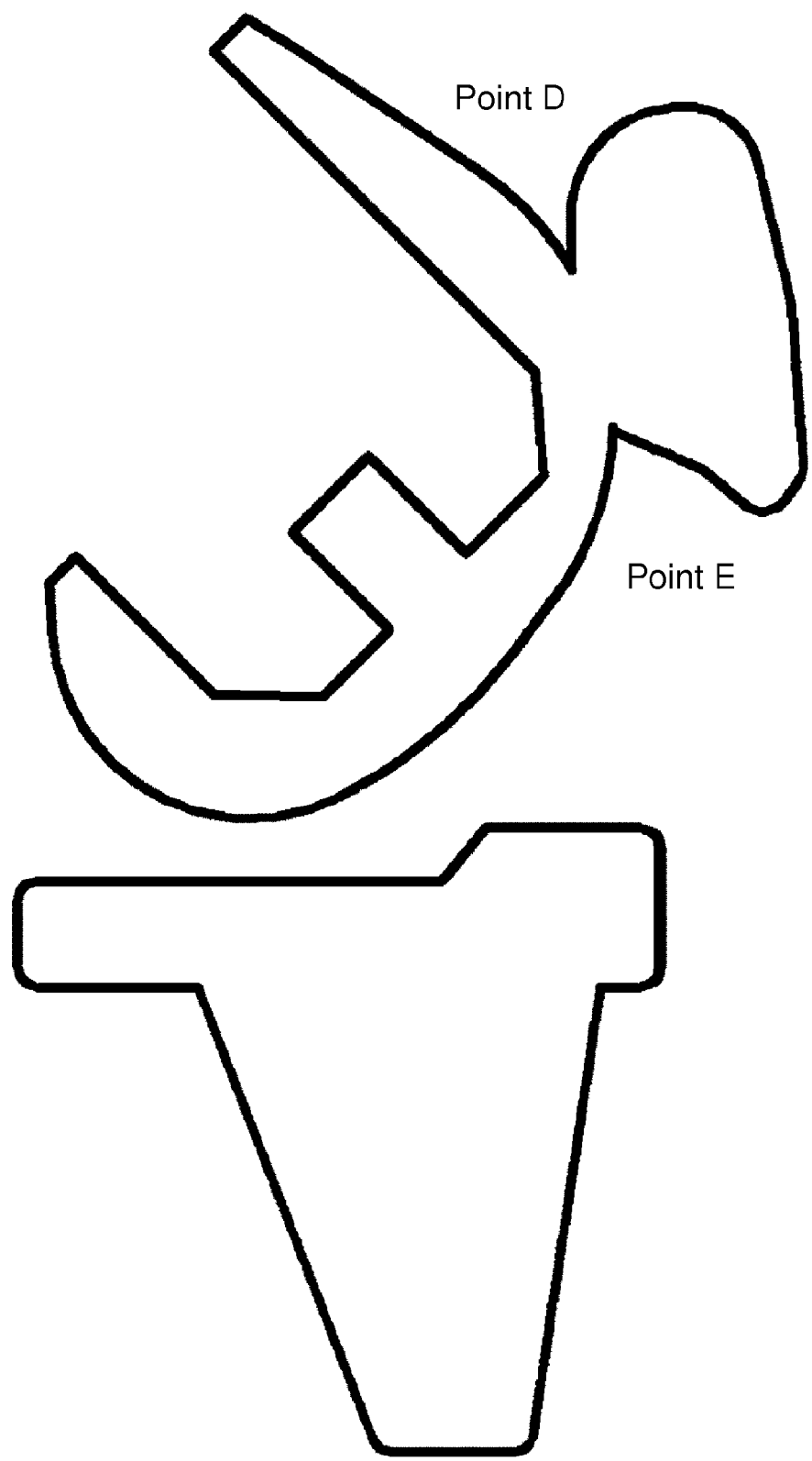
FIG. 16 is a frame format illustrating the contour, which is obtained when a knee joint is X-ray photographed after an artificial joint replacement.
Figure 17:
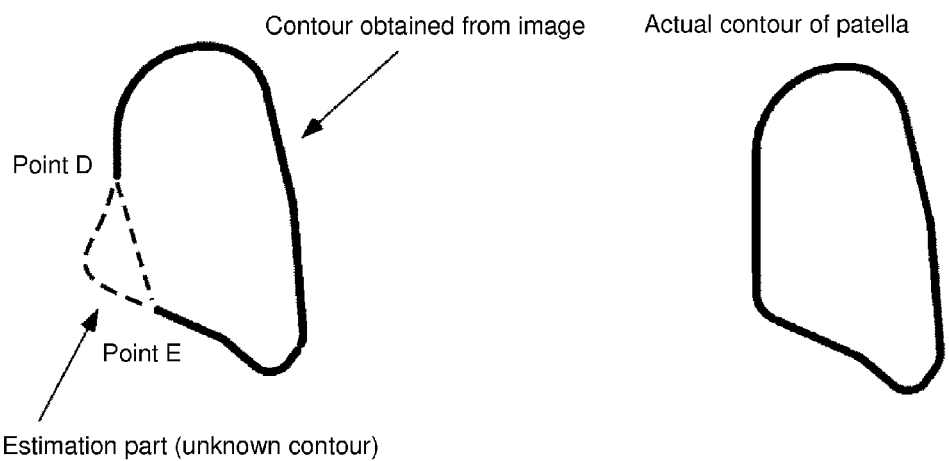
FIG. 17 is a view illustrating the contour extracted as patella (right) from what is shown in FIG. 16 and the contour of the actual patella.

FIG. 16 shows a typical frame format of extracted contours of a femur bone component, a tibial bone component and a patella (or a patella component) when X-ray photographed after an artificial knee joint replacement. As shown in FIG. 16, a part of the contour of the patella (or the patella component) is overlapped with the femur bone component, and therefore the contour of the overlapping part is unknown. As shown in FIG. 17, the shape of the contour line (dotted line between point D and point E) is unknown, and it is difficult to obtain a single contour line. If point D and point E are connected by a straight line to make a closed curve contour, the errors in estimation on the position and attitude increase as unknown regions increase as shown in FIG. 15.

In contrast, the contour line shown in a solid line can be reliable as that of the patella (or the patella component). The contour line of this part is supposed to coincide with the contour line of the patella (or patella component) to be selected from the databases. In short, the point D and the point E in the input image are supposed to exist on the contour line of the patella (or the patella component) to be selected from the databases.

By using findings from experiments and the above rule a proper patella (or a patella component) can be selected from the databases based on the method shown below, even if a part of the patella (or the patella component) is not reliable.

Figure 18:
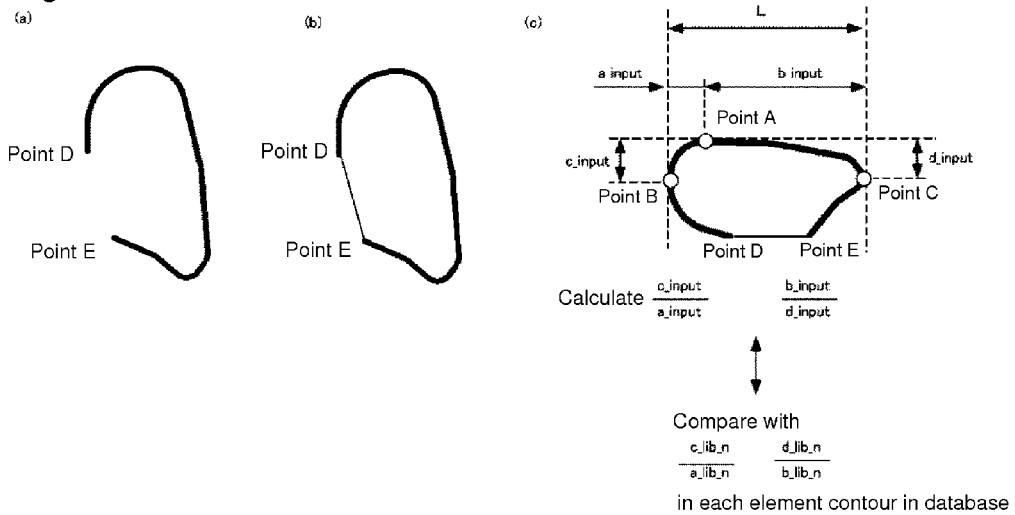
FIG. 18 is a view illustrating (procedure 1), (procedure 2) and (procedure 3) corresponding to (a), (b) and (c) respectively.

(Step 1) A closed curve contour is formed by connecting with a straight line the unclear region of contours on the patella (or the patella component) in the input image (see FIG. 18(b)).

(Step 2) A rotation angle θ' is searched for by rotating the closed curve contour with closed curve Fourier descriptors applied to the closed curve contour such that the width L_input of the patella (or the patella component) becomes the largest (point D and point E are arranged to be positioned on a lower side) (see FIG. 18(c)).

(Step 3-A) At the rotation angle θ', the highest point A, left end point B and right end point C are defined. The lengths in horizontal and vertical directions between point A and point B are defined as a_input and c_input respectively, while the lengths in horizontal and vertical directions between point A and point C are defined as b_input and d_input, respectively (index "input" stands for "input image").

(Step 3-B) Step 2 and Step 3-A are implemented with respect to each element-contour constituting the databases to identify three points corresponding to point A, point B and point C in the input image and define them as point A', point B' and point C'. Further, a_lib_n, c_lib_n, b_lib_n and d_lib_n are obtained with respect to each element-contour (index "lib" stands for database and "n" stands for the number of each element-contour in the database).

(Step 3-C) c_input/a_input and d_input/b_input are obtained and compared with c_lib_n/a_lib_n and d_lib_n/b_lib_n in each element-contour. Numbers of each element-contour that is different from c_input/a_input and d_input/b_input by a given ratio or more, are canceled from the database (see FIG. 18(c)). The remaining element-contours are used to constitute a child database.

Figure 19:
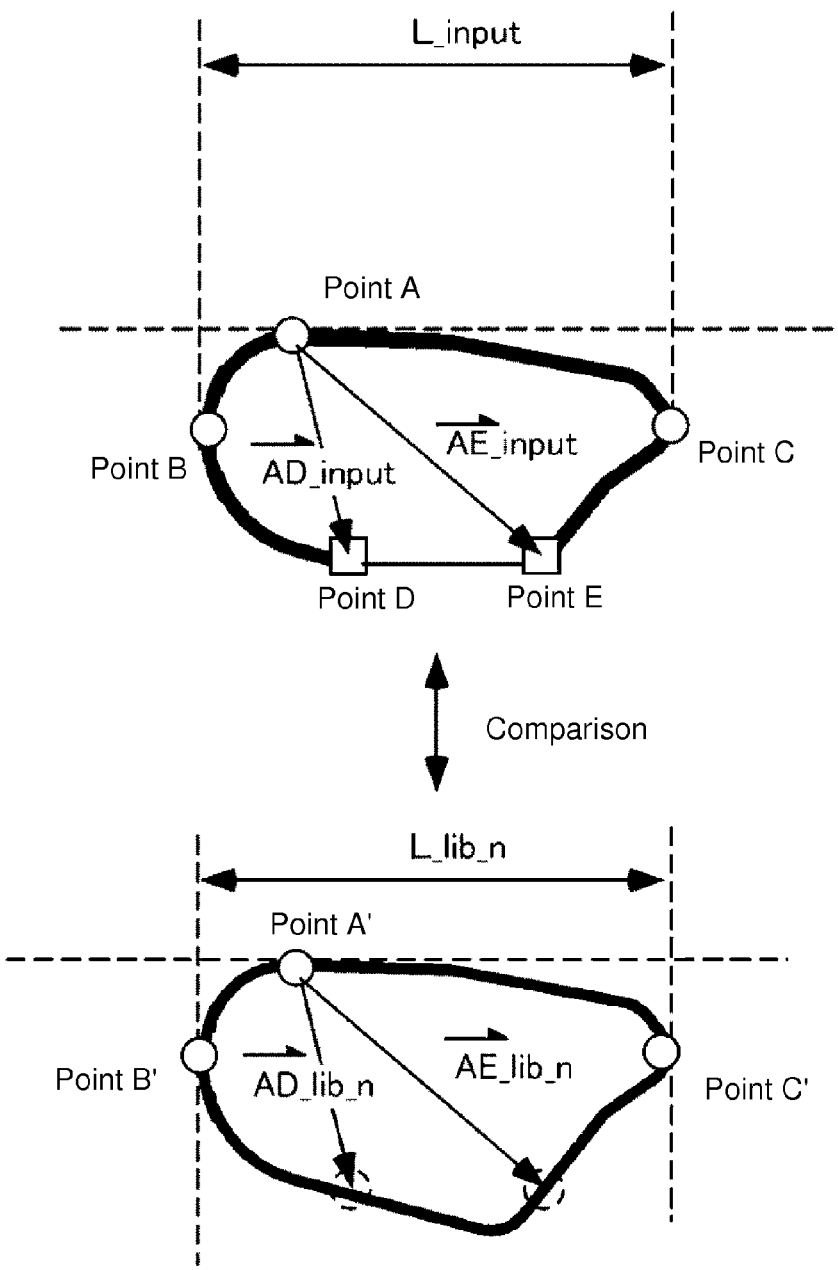
FIG. 19 is a view illustrating (procedure 4).

(Step 4-A) Vector AD_input and vector AE_input are defined with respect to points D and E that are edge points on a reliable contour part of the patella (or the patella component) in the input image (see upper FIG. 19).

(Step 4-B) With point A' being as a start point, on each element contour (or patella component) in the child data base, vector AD_lib_n and vector AE_lib_n are drawn defined by the following formulas (see lower FIG. 19).

$$\vec{AD}\_lib\_n = \frac{\vec{AD}\_input}{|\vec{AD}\_input|} \times \frac{L\_lib\_n}{L\_input} \quad \text{[Formula 14]}$$

$$\vec{AE}\_lib\_n = \frac{\vec{AE}\_input}{|\vec{AE}\_input|} \times \frac{L\_lib\_n}{L\_input}. \quad \text{[Formula 15]}$$

(Step 4-C) Numbers of element-contours with no nodes defining the contours near the heads of vector AD_lib_n and vector AE_lib_n are canceled from the child database.

With respect to remaining element-contours, the points on the contours located at the heads of the vector AD_lib_n and the vector AE_lib_n are defined as point D' and point E' respectively.

(Step 5-A) Open curve Fourier descriptors (described below) is applied to three open curves passing through points D-B-A, points E-C-A and points B-A-C in the input images (see upper FIG. 20).

Figure 20:
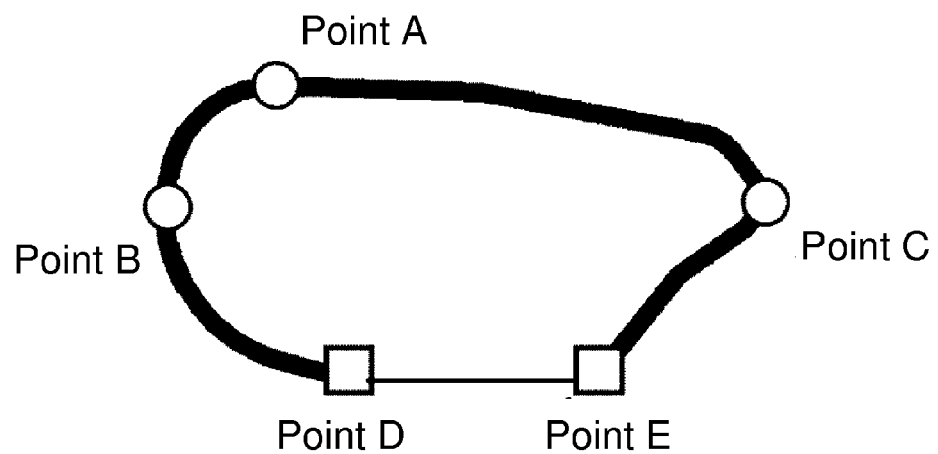
FIG. 20 is a view illustrating (procedure 5).
Figure 20:
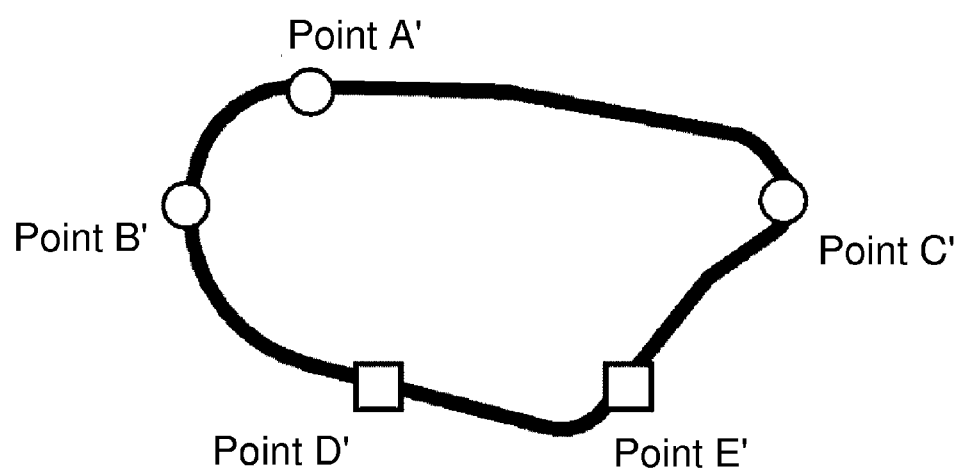

(Step 5-B) With respect to the remaining element-contours, open curve Fourier descriptors are applied to three open curves passing through points D'-B'-A', points E'-C'-A' and points B'-A'-C' (see lower FIG. 20).

(Step 5-C) With respect to each of three open curve Fourier descriptors applied to the input images and the remaining element-contours, error E is obtained by Formula 7 and the number of the element-contour with the smallest sum of errors in the three open curve Fourier descriptors is selected.

(Step 6) Position and attitude are estimated from the selected element-contour number using Formula 8 to Formula 13 or based on the method described in non-patent literature 1.

(Step 2) and (Step 3) are based on the findings from an experiment that the position and attitude estimation of a patella is performed by change of the long radius and the short radius of an ellipse.

(Step 5) is based on the findings from an experiment that change in curvatures of the region 1 and the region 2 has a significant effect on the estimate accuracy.

(Step 4) is based on the findings from an experiment that a start point and an end point required to apply open curve Fourier descriptors to element-contours must be determined. The contour is divided into a reliable part and a non-reliable part and the feature of the border points similarly existing on the contour with respect to the selected element-contour number is used.

Figure 21:
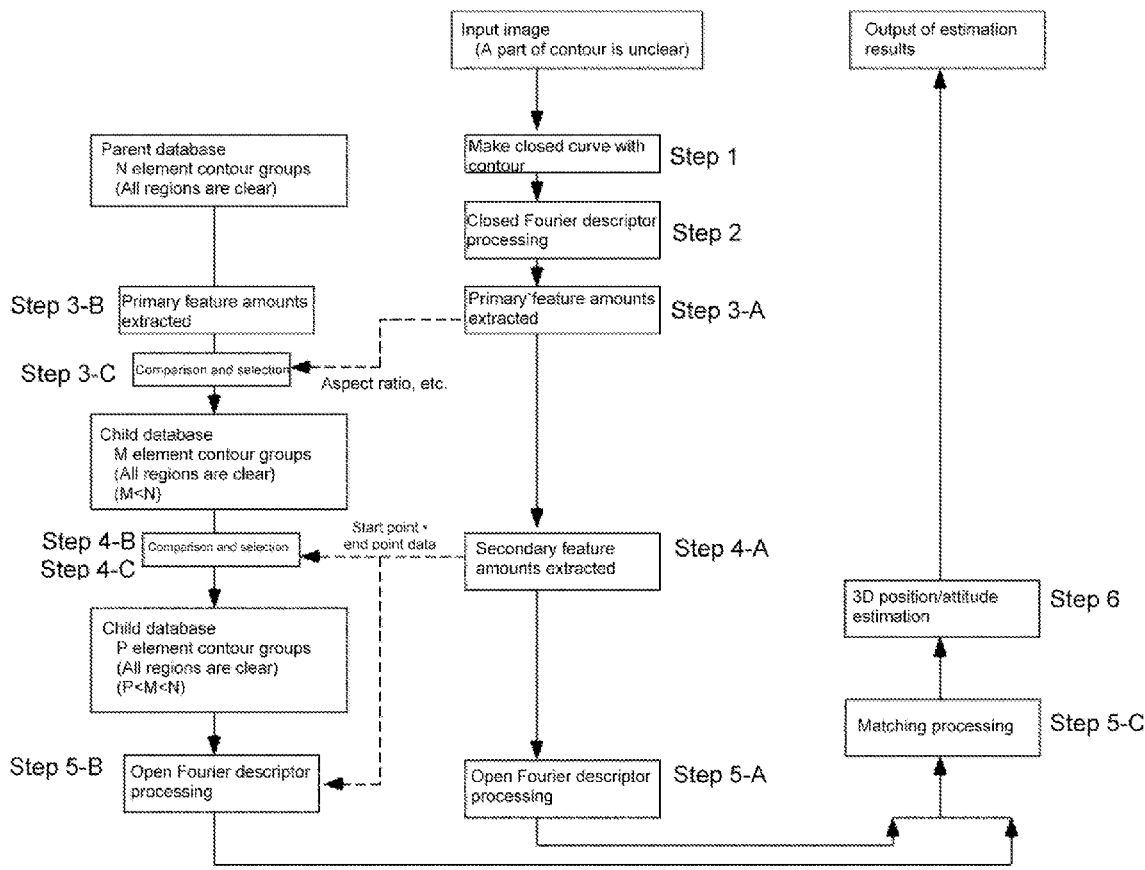
FIG. 21 is a flow chart of procedures.

FIG. 21 shows a flow chart.

In the method of determining point D and point E in the input image, since contour angle sharply changes at the part where a femur bone component and a patella (or a patella component) are overlapped as shown in FIG. 16, the points with sharp angle-changing rate can be determined as point D and point E. The method of extracting angles, which is described in "Angle Detection on digital Curves" (IEEE Trans. Comp., Vol. C-22, 875-878, 1973) Rosenfield, A. and Johnson, E. or "High-speed detection of similar points based on difficulty level of discrimination" Kanou (or three others) (Information Processing Society of Japan (IPSJ), Vol. 42(11), 2689-2698, 2001) etc., can be employed.

According to the present embodiment, in a parent database storing overall clear element-contours, a plurality of feature amounts are extracted from the input image to narrow down the element contour group stored in the database. According to the conventional method, in the estimation method of 3D position and attitude using Fourier descriptors, as the parent database is more detailed (a 2D projection image on a plane is provided at every small angle), so accurate can be the estimation on position and attitude. However, the computation time also increases along with the size of database. Further, if a part of the contour is deficient, since locations of the start point and the end point are not determined on the contours stored in the database, the computation time increases in proportion to the number of combinations of start points and end points if a matching computation is performed to recover the deficiency.

In contrast, according to the present embodiment, even if a part of contour of the input image is deficient, a child database is prepared by selecting an element contour group in databases with an extractable feature amount, and open curve Fourier descriptors are applied by determining the start point and the end point, and thus even if the parent database is prepared in detail, a high-accurate estimation on 3D position and attitude can be performed in comparatively short computation time.

<Experimental Result Using Open Curve Fourier Descriptors>

Figure 22:
FIG. 22 is a view illustrating a contour of input element, which is used in <experimental result using open curve Fourier descriptor>.

An image of a patella in which a part of the contour is deficient as shown in FIG. 22 (unclear) is provided and processed by implementing the above steps. The figure shown in FIG. 22 has 2 degrees in X angle and 0 degrees in Y angle respectively. Now, it is verified that an image photographed at the above angle can be selected from the database by implementing the above steps. The database includes element-contours photographed at every 1 degree from −5 degrees to +5 degrees with respect to X angle and Y angle (composed of 11×11=121 element-contours)

(Step 2) was implemented for the input image to find width L_input=226 pixels and rotation angle θ=11 degrees. (Step 3) was implemented to find that c_input/a_input=0.536, and d_input/b_input=0.395. After selecting element-contours from the database with a ±5% error tolerance, 44 element-contours were left in the database, which had initially included 121 element-contours.

Next, with these element-contours used as a child database (Step 4) was implemented. After selecting element-contours from the database with a ±5% error tolerance, 15 element-contours were left in the database. X angles and Y angles of the remaining element-contours are shown in Table 1. It is found that the image, which has 2 degrees and 0 degrees with respect to X angle and Y angle respectively, is included in the input image.

With regard to the last remaining element-contours and the input image, errors from three open curves were determined using P-type Fourier descriptors. Assessment function of the i-th element-contour is defined as $$E_i = \frac{E_{1,i}}{E_{1,min}} + \frac{E_{2,i}}{E_{2,min}} + \frac{E_{3,i}}{E_{3,min}}, \quad \text{[Formula 16]}$$

and an element-contour number with the smallest Ei was selected (see table 1).

It was found from this table that the element-contour with name s_5 has the smallest Ei, and X angle and Y angle of the element-contour are 2 degrees and 0 degrees respectively. These angles coincide with those of the input image.

TABLE 1

Angles of element-contours remaining in child database and values of assessment function

| Name | i | Angle ($\theta_x, \theta_y$) | $E_{1,i}/E_{1,min}$ | $E_{2,i}/E_{2,min}$ | $E_{3,i}/E_{3,min}$ | $E_i$ |
|---|---|---|---|---|---|---|
| s_1 | 1 | (0, −5) | 1.89355671 | 5.96680737 | 1.65920866 | 27.04131218 |
| s_2 | 2 | (1, −1) | 0.648646235 | 3.30089879 | 0.2666879 | 10.27168497 |
| s_3 | 3 | (1, −2) | 5.11226988 | 1.73895025 | 0.187377423 | 20.16234981 |
| s_4 | 4 | (1, −5) | 5.40231371 | 4.38541317 | 1.73097062 | 34.79523546 |
| s_5 | 5 | (2, 0) | 0.328983337 | 0.480008543 | 0.267941773 | 3.429957616 |
| s_6 | 6 | (2, 1) | 0.422647953 | 3.02908731 | 0.242440671 | 8.889058317 |
| s_7 | 7 | (2, −1) | 0.538292646 | 1.48135912 | 0.310425758 | 6.37902773 |
| s_8 | 8 | (2, −3) | 1.32406998 | 4.32171869 | 1.45093763 | 20.77154924 |
| s_9 | 9 | (2, −4) | 5.44087553 | 5.5755024 | 1.51662052 | 36.24781063 |
| s_10 | 10 | (2, −5) | 5.39191675 | 4.14579535 | 1.54888821 | 33.29269579 |
| s_11 | 11 | (3, −2) | 1.09954405 | 4.05190468 | 1.3693552 | 19.0915716 |
| s_12 | 12 | (3, −3) | 1.29340005 | 4.31727791 | 1.3783946 | 20.28192213 |
| s_13 | 13 | (3, −4) | 5.31506348 | 2.93968391 | 1.59718537 | 30.80415331 |
| s_14 | 14 | (3, −5) | 5.39440012 | 3.94845343 | 1.4607875 | 32.4189449 |
| s_15 | 15 | (4, 5) | 4.97041035 | 1.93586433 | 1.92945826 | 29.43855012 |

From this experiment, it is found that the element-contour with the same angle is selected from the database by executing the above algorithm even if a part of the contour is unclear. Similar 20 experiments were implemented and element-contours with the same angles as X angle and Y angle of the input image were selected in 16 experiments without errors. Although different images were selected in 4 experiments, the average angle error of 20 experiments was 0.25 degrees.

While the estimation of the position and attitude may use Formula 8 to Formula 13, Z-axis rotation (Formula 10) may use:

$$\theta_{Z\_est}=(\theta_{z\_input}+\theta'_{input})-(\theta_{z\_select}+\theta'_{lib}) \quad [\text{Formula 17}]$$

The reason is that rotation $\theta'$ is added to maximize the width L after normalization.

According to the present embodiment, since the distance between the X-ray source and the projection plane in element-contours stored in database is arranged to correspond with that of the input image, Formula 11 to Formula 13 may be applied to the position estimation. Non-patent literature 1 shows a higher-accurate method of estimating position and attitude in consideration of apparent rotation angles, and Formulas enabling to estimate the position and attitude even when the distance between the X-ray source and the projection plane in the database is not matched with that in the input image. The above method and Formulas described in non-patent literature 1 may be used with regard to Formula 11 to Formula 13.

Figure 23:
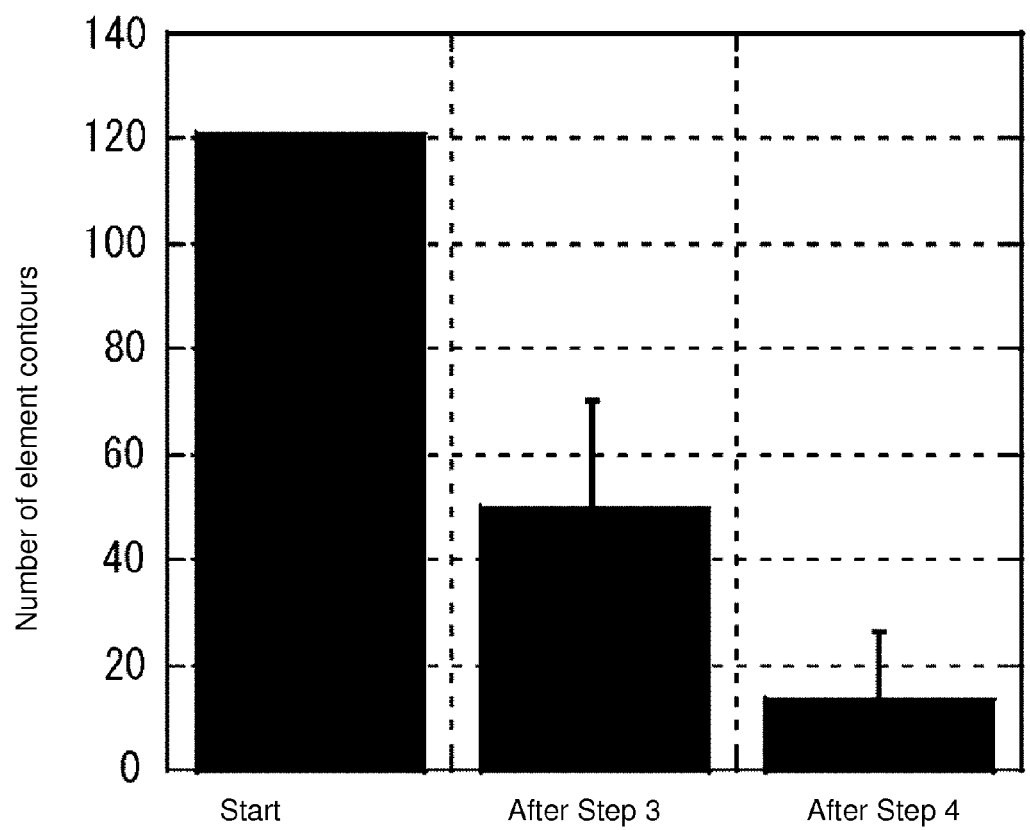
FIG. 23 is a view illustrating change in the number of element-contours when performing each procedure.

In the present invention, the more detailed database is prepared in advance, the higher the accuracy of the estimation for the position and attitude may become. However, the more detailed database is prepared, the more time is required. Therefore, eliminating unnecessary element-contours in (Step 3) and (Step 4) brings about a significant effect in reducing the computation time. FIG. 23 shows the remaining number of element-contours (error bar stands for standard deviation) when (Step 3) and (Step 4) are executed in 20 trials implemented with various input images. It is found that after (Step 3), the number of element-contours is reduced to 50% of the original number on average, and is further reduced to approximately 15% of the original number on average by implementing (Step 4). According to this method of estimation, the more number of element-contours is prepared, the more detailed estimation on angle/position is possible. However, generally, if a detailed database is provided, data memory capacity to be secured and computation quantity is largely increased. The part that requires the longest time is the computation of Fourier descriptors. By using the method of estimation according to the present invention, the number of database required for computation of Fourier descriptors can be reduced to approximately 15%. Therefore, the estimation of angle can be performed in a very short time (approximately 15% of overall computation) even when detailed estimation on angle/position is performed.

Figure 24:
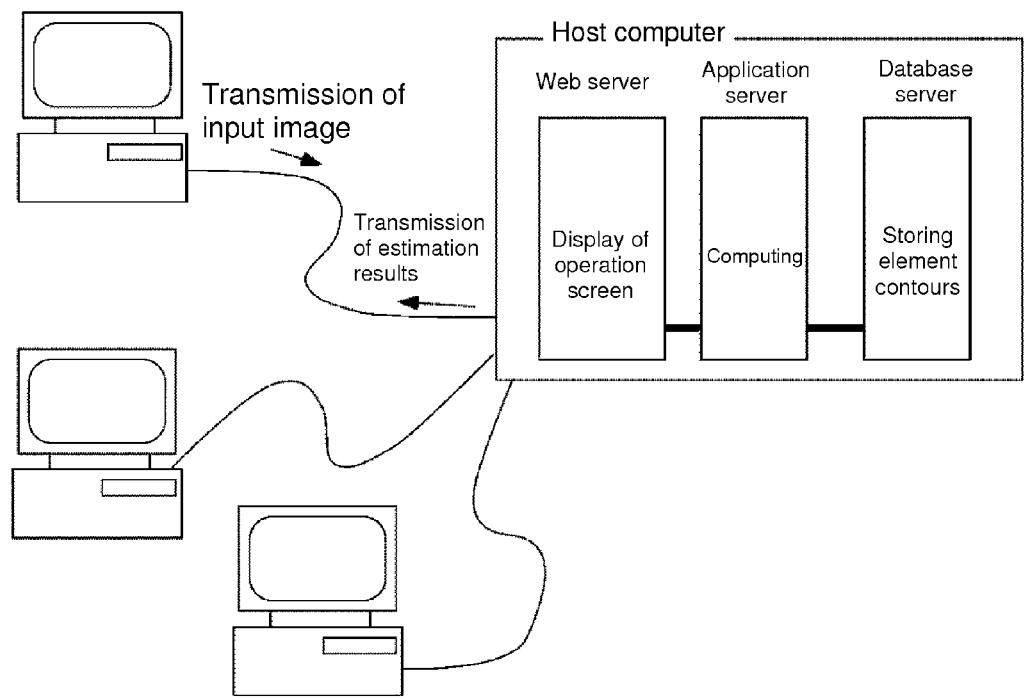
FIG. 24 is a view illustrating an example using a network according to the present invention.

In the case where the number of patients requesting for the estimation on the position and attitude of the patella, etc. is small and high estimate accuracy is not required, the memory capacity of a database may be small, and thus the present invention can be implemented by a single PC. However, in the case where a large majority of patients want to estimate the position and attitude of the patella, etc. or a high-level estimate accuracy is requested, a single PC is not enough to secure a necessary memory capacity. Accordingly, a host computer, including a large-capacity data memory device (data-base server), high-speed operational equipment (application server) and a server providing an operation screen, etc. (Web server), is separately provided in a remote location. Input images are transmitted to the host computer in a remote location via network such as internet, and (Step 1) to (Step 6) are implemented by the application server, thereby enabling a high-accuracy estimation on the position and attitude that cannot be performed by a single PC to be performed or a plurality of input images can be processed in parallel (see FIG. 24).

Various advantages are brought about by the above configuration. Clients such as hospitals, etc. can implement the present invention without introducing a particular operational equipment. In addition, past data on the position and attitude estimation including other institutions can be retrieved, and thereby an assessment based on relative comparison with the present data on the position and attitude estimation can be performed. As such, obtained estimation results on the position and attitude can be used as a basic data for a high-accuracy diagnosis made by a doctor.

Embodiment 2

Next, Embodiment 2, which is another embodiment according to the present invention, is described. Embodiment 2 is different from Embodiment 1 in the following respects. (1) While point A on the contour is used as the start point of the vector in FIG. 19 in Embodiment 1, point α, at which skeletal lines extracted through skeletalization process join together, is used as the start point of the vector in Embodiment 2.

(2) While a single deficient part in the contour is applied to Embodiment 1, two or more deficient parts in the contour may be applied to Embodiment 2. Deficient parts occur when intentionally removing, parts adjacent to neighboring bones. Further, the parts outside of the X-ray projection image may be deficient parts.

Hereinafter, Embodiment 2 is described in detail.

<Preparation of Library>

3D models of key bones such as a single femur bone, ossa cruris, etc. are preliminarily prepared by using a CT device, etc. These 3D models are projected on a projection plane at a given distance from various different angles ($\theta x, \theta y$) such that they are in the same condition as the actual X-ray photography, and the contour lines are stored in a library. The stored data is linked to angles so as to recognize from which angle the contour is photographed and prepared.

In the contour group stored in this library, overall part of contours with respect to the key bones are all clear and are made up of closed curves. Although 3D models may be prepared by photographing the real things by a camera, since a CT device can create 3D models with digital data, all this process is preferably implemented by a computer.

<X-Ray Image to be Assessed>

Figure 25:
FIG. 25 is a view illustrating an X-ray image of a typical knee joint.
Figure 25:
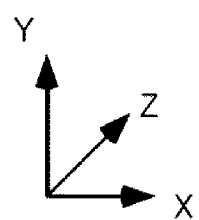

FIG. 25 shows an image of a knee joint photographed by X-rays. A coordinate system is shown under the photograph. The knee joint part includes a femur bone, an ossa cruris (actually including two splint bones in parallel with a tibial bone) and a patella. The knee joint is one of the largest joints in a human body as well as one of the joints most likely to contract a joint disease. The femur bone and the ossa cruris are called long bones, which are elongated having a center part formed substantially cylindrical. The end parts, including joints, are formed in somewhat complex shapes compared to the center part. However, the end parts are also made up of curved surfaces, and thus there are no so-called feature points such as projection parts or right-angle parts, which are commonly used in image processing.

Joint diseases commonly occur at joint parts. When diseased parts in the long bones are photographed, none but near the joint parts can be photographed, and thus X-ray images taking the whole images of femur bone or ossa cruris are difficult to obtain. As such, only a part of joint parts can be photographed to make X-ray images with respect femur bone or ossa cruris.

<Determination of Primary Feature Point>

There is a possibility that a femur bone contacts or overlaps with a patella and an ossa cruris, while there is a possibility that an ossa cruris contacts or overlaps with a femur bone. Therefore, features, which are not subject to change even though other objects contact or overlap with these objects, are extracted with respect to these objects.

Figure 26:
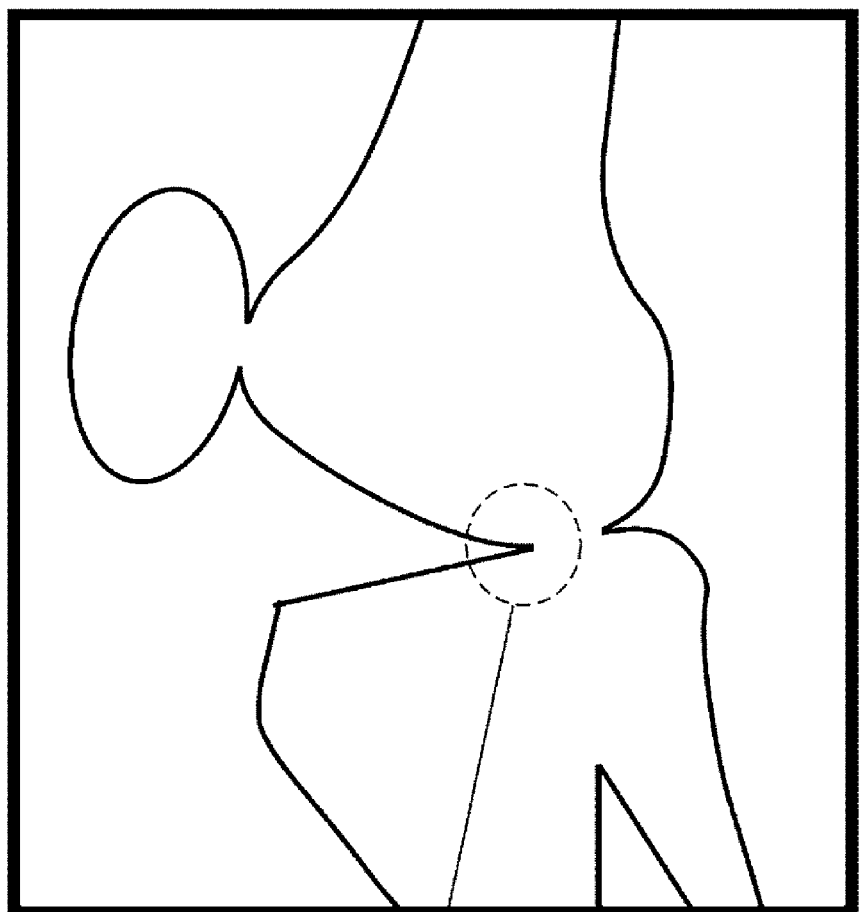
FIG. 26 is a frame format of a contour extracted from an X-ray image of a knee joint.
Figure 26:
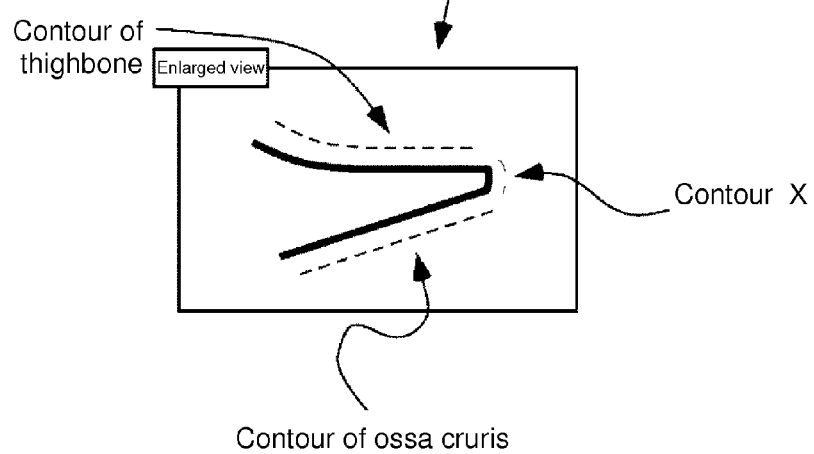

First, contours are extracted. A frame format of contours extracted from FIG. 25 is shown in FIG. 26. According to this drawing, although contours of the patella, the femur bone and the ossa cruris look clearly separated from each other, there exist regions difficult to determine which contours of bone they belong to.

With regard to the ossa cruris and the femur bone, the regions subject to overlap with other bones are artificially canceled. With regard to only the remaining regions, the inside of contours are filled (edge points of canceled contour lines are connected by straight lines). Following the above process, skeletalization process (for example, Kenichi Hirose, "Recognition of finger alphabets by thinning the image", Information Processing Society of Japan (IPSJ) Research paper, Computer vision report of workshop, vol. 93, No. 66, pp. 1-6, 1993), is applied to extract a skeleton of the object.

Figure 29:
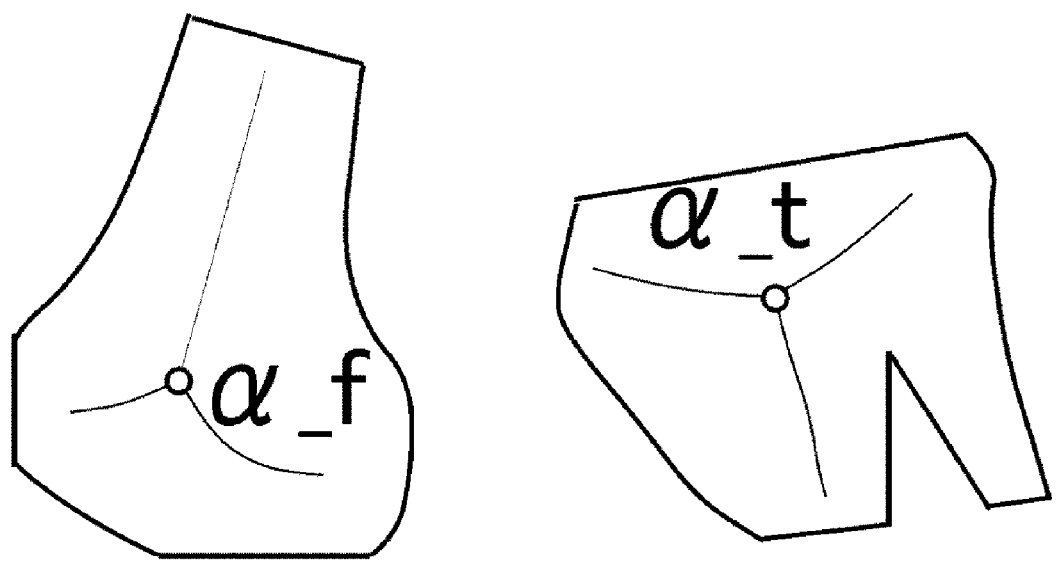
FIG. 29 is a view illustrating relations among contours, skeletal lines and primary feature points.

Points, at which skeletal lines from around joint join together among the extracted skeletons, are defined as $\alpha\_f$, $\alpha\_t$ (see FIG. 29). Index f stands for a femur bone and t stands for an ossa cruris.

Figure 27:
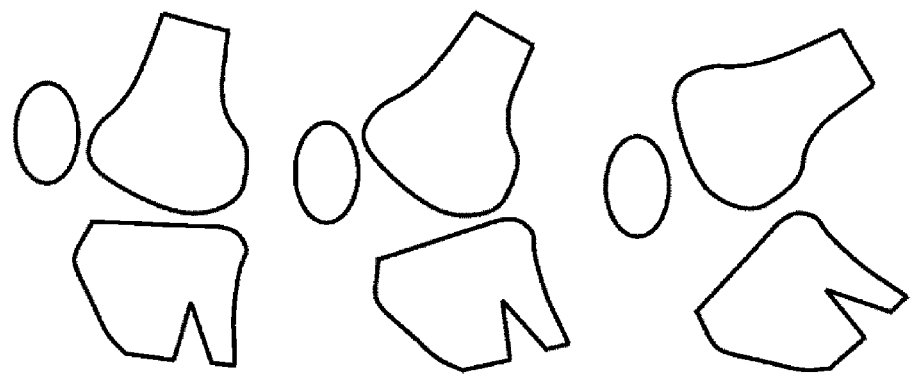
FIG. 27 is a frame format of contours at different knee bending angles.
Figure 28:
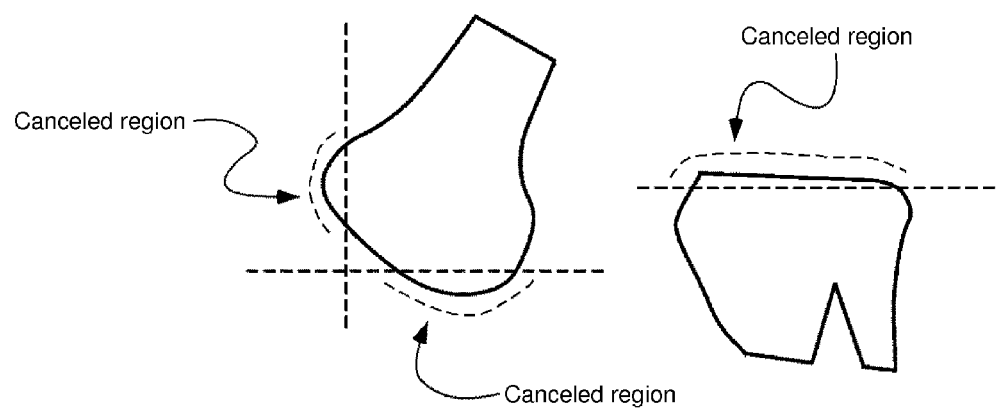
FIG. 28 is a view illustrating cancel regions.

As shown in FIG. 27, several bending angles are simulated, when cancel regions were modified based on the arrangement of the ossa cruris and the femur bone. Cancel regions simulate regions in which contours may not be clearly determined due to overlap with other bones.

With respect to $\alpha\_f$, $\alpha\_t$, the variation between the cancel amount and the positions was examined. When $\alpha\_f$ was normalized with thickness L1 that is a substantially constant bone thickness in the center part of the thigh, a translation up to approximately 7% was found in X-axis direction (horizontal direction in FIG. 25) or Y-axis direction (vertical direction in FIG. 25). When $\alpha\_t$ was normalized with L1, the translation was found a little less than 4%.

These values are based on the condition that the cancel amount is estimated sufficiently larger than the actual overlapping amount, and the translations of $\alpha\_f$, and $\alpha\_t$ were found almost negligible regardless of bending angles in the case of an X-ray image of the actual knee joint. Further, even if no clear determination of contours is possible as to which bones they belong to due to a contact or an overlap with other bones, it was found that the translations of $\alpha\_f$, $\alpha\_t$ c were almost negligible by using other contour lines that can be clearly determined as to which bones they belong to.

In this respect, $\alpha\_f$ and $\alpha\_t$ obtained through the skeletalization process can be considered to be the points that are affected neither by any bending angles nor by any positions of neighboring bones. Therefore, $\alpha\_f$ and $\alpha\_t$ obtained through the skeletalization process are named as primary feature points.

<Determination of Secondary Feature Point>

Since only a part near the joint can be photographed in an X-ray image with respect to a femur bone and an ossa cruris, images other than those preliminarily determined are canceled. This contributes to reducing the amount of data when preparing a library described later. This process is the same as the above Steps in canceling a certain part of the contours of the femur bone and the ossa cruris. However, since its purpose is different, this process is hereinafter referred to as "osteotomy". This process is determined based on the following Steps. A femur bone is taken as an example.

(Step 1) Point $\alpha$ is defined (white circle).

(Step 2) A straight line is defined as connecting point a to a point that is at a predetermined distance L_st01_f (20 pixels in this Embodiment. The distance is represented by pixels) apart from point a on the skeletal line in a direction away from the joint. This is called dotted line A_f (dotted line A_t in the case of ossa cruris).

(Step 3) A straight line orthogonal to the dotted line A_f is defined as passing through a point that is at a predetermined distance L_st02_f (100 pixels in this Embodiment) apart from point a on the dotted line A_f in a direction away from the joint.

This is called dotted line B_f (dotted line B_t in the case of ossa cruris).

(Step 4) The intersection points with the dotted line B_f and the contour of the femur bone are defined as $\beta$, $\gamma$, respectively (black circle).

Figure 30:
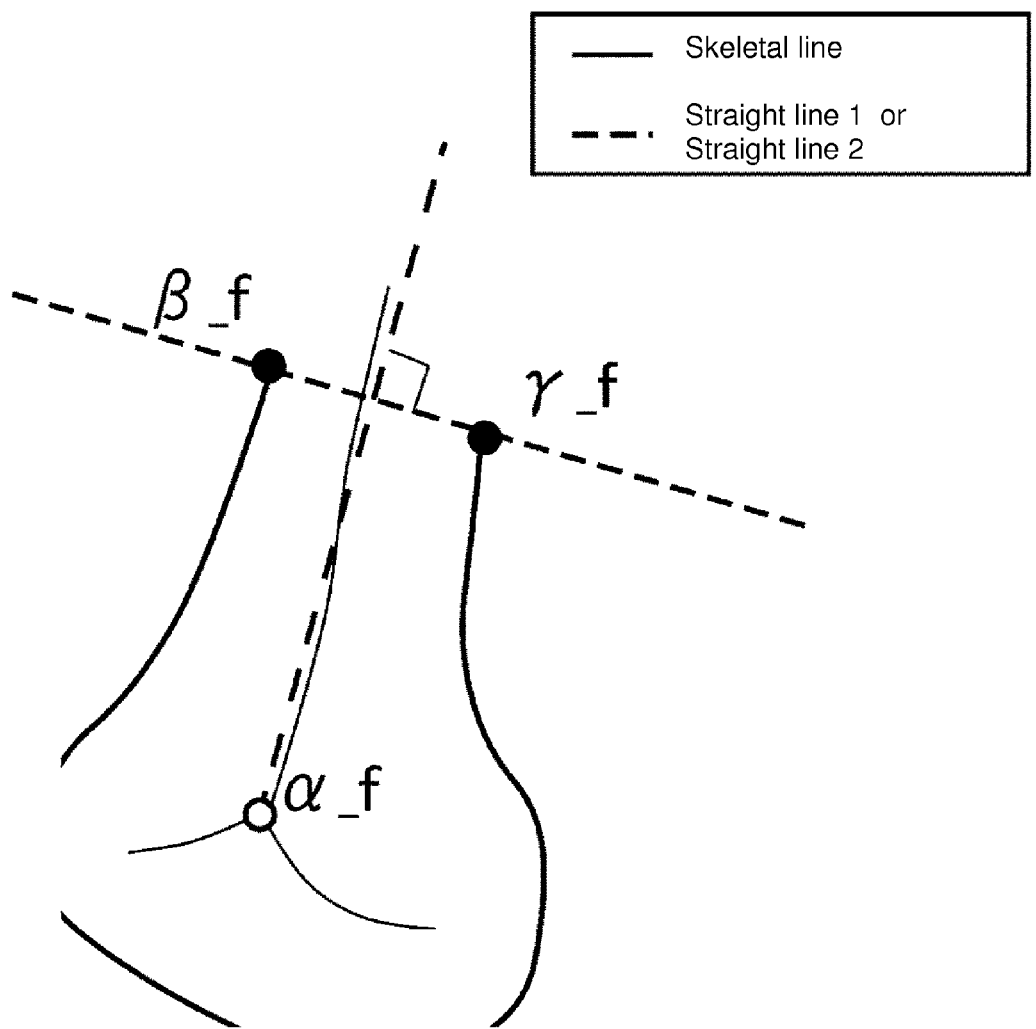
FIG. 30 is a view illustrating secondary feature points.

These points $\beta$, $\gamma$ are called secondary feature points. Regions in which no contours exist between points $\beta$, $\gamma$ are connected by straight lines. FIG. 30 shows a figure after these Steps implemented.

Here, the osteotomy can be performed at a distance with a constant fraction from the primary feature point for any bone with any size by normalizing L_st01_f and L_st02_f with a characteristic dimension of bone (for example, approximately constant thickness L1 of a center part of the thigh).

The osteotomy can be performed also for ossa cruris by implementing similar Steps.

L_st01_f and L_st02_f corresponding to L_st01_f and L_st02_f are not necessarily the same as L_st01_f and L_st02_f respectively. They may be defined in response to the characteristics of the ossa cruris.

<Determination of Third Feature Point>

Figure 31:
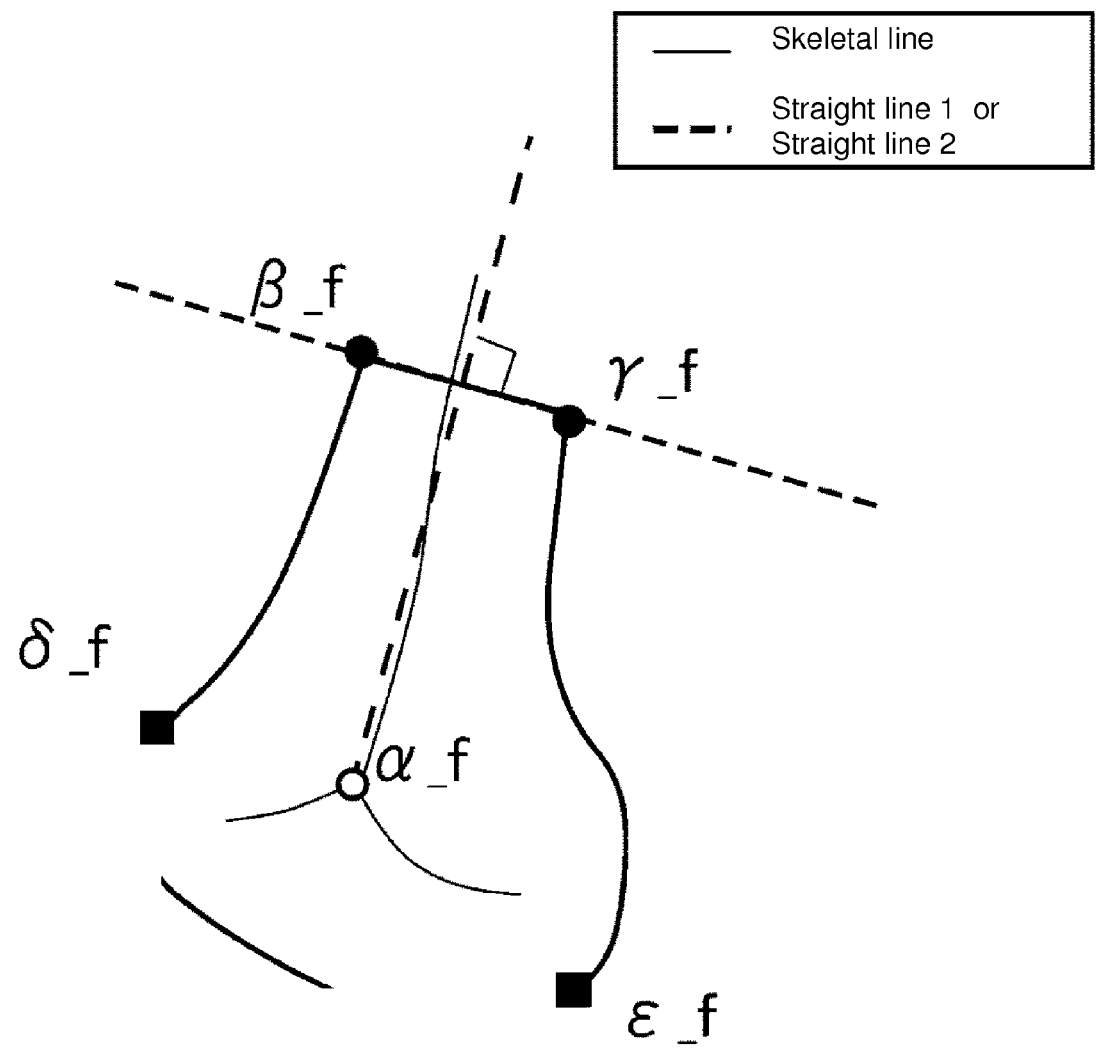
FIG. 31 is a view illustrating third feature points (femur bone).
Figure 32:
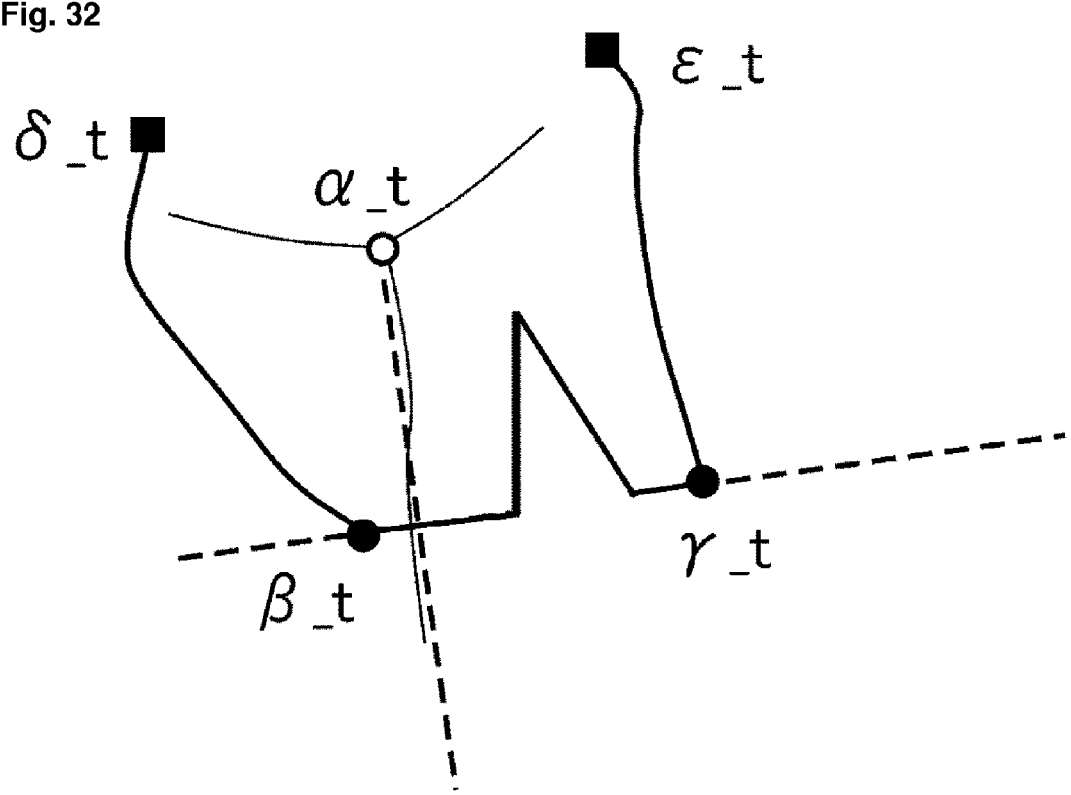
FIG. 32 is a view illustrating third feature points (ossa cruris).

Among contour lines left after cancellation shown in FIG. 30, edge points of contour lines generated by the cancellation are defined as the third feature point. In the contour line including point β, edge points generated by the cancellation are defined as points δ, while in the contour line including point γ, edge points generated by the cancellation are defined as points ϵ. FIG. 31 shows a result of a femur bone and FIG. 32 shows a result of an ossa cruris.

<Determination of Feature Vector>

Four feature vectors, vector αβ, vector αγ, vector αδ and vector αϵ, are defined with primary feature point α as start point.

<Normalization Fourier Descriptor>

Fourier descriptors are variously changed depending not only on the contour shape but also on the position, the size and the direction of the contour image itself. Therefore, the Fourier descriptors are normalized with the position, the size and the attitude (Formula 18), and are converted to the specific value of the contour shape, which is called normalization Fourier descriptors (NFD).

$$c(0)=0$$

$$c^1(n)=c(n)/|c(1)|$$

$$c(n)=c^1(k)e^{-k\{(k-K)u+(1-k)v\}/(K-1)]}$$

$$-N/2+1 \leq k \leq N/2$$

N: Number of points on the contour.

$C(0)=0$ in the first line represents parallel translations in XY directions (normalization in X direction and Y direction).

$|C^1(1)|$ in the second line represents the magnitude of the contour line (normalization in Z direction).

The third line represents the normalization in rotational direction around Z-axis. In this way, the position, the size and the attitude are normalized (see FIG. 4).

NFD can display a spectrum and perform the template pattern matching by comparing this spectrum.

<Normalization of Contour Line>

After implementing the above Steps, remaining original contour lines are open curves point β-point δ, and point γ-point ϵ. Here, three open curves, an open curve point β-point δ, an open curve point γ-point ϵ and an open curve point δ-point β-point γ-point ϵ are described by P-type Fourier descriptors. These three open curve Fourier descriptors are compared to those in a library based on the method described later. When these are normalized using Formula 18, contour are directed in the same direction as shown in FIG. 4. A rotation angle caused by normalization of contours of the intended bone is defined as θz_f in the case of a femur bone and θz_t in the case of an ossa cruris. Further, a rotation angle caused by normalization of each of the contour groups in the library is defined as θz_lib. Furthermore, the size of the contour is also made the same as that in the library through the normalization. The size is obtained from $|C^1(1)|$ of Formula 18. The size of the object is defined as $|C^1(1)|\_f$ (in the case of a femur bone) and $|C^1(1)|\_t$ (in the case of an ossa cruris) and $|C^1(1)|\_lib$ (for that in the library).

<Comparison with Library Using Feature Points>

As described above, the primary feature point has an almost non-moving feature regardless of the existence of overlapping regions with other bones. Thus, also in the contour groups in the library, the skeletalization process is performed to obtain the primary feature point. This point is defined as α_lib_f (index lib means library).

With the point α_lib_f as a start point, vector αβ, vector αγ, vector αδ and vector αϵ are multiplied by $C^1(1)|\_lib/|C^1(1)|\_f$ (in the case of femur bone) or by $|C^1(1)|\_lib/|C^1(1)|\_t$ (in the case of ossa cruris), and then are rotated by θz_lib−θz_f (in the case of femur bone) or by θz_lib−θz_t (in the case of ossa cruris), and thereby being defined as vectors, vector α'β, vector α'γ', vector α'δ' and vector α'ϵ'.

Meanwhile, in the contour groups in the library, if there is a match with a contour of the intended bone, the contour exists near the four vectors, vector α'β, vector α'γ', vector α'δ' and vector 'ϵ' with this point a_lib_f as a start point. Therefore, candidates that coincide with the intended bone can be narrowed down from contour groups in the library by using these four feature vectors.

Further, points at the intersection of the lines or the extended lines of four vectors, vector α'β, vector α'γ', vector α'δ' and vector α'ϵ' with the contour lines of the library are defined as point β_lib, point γ_lib, point δ_lib and point ϵ_lib. Point β_lib and point γ_lib are connected by a straight line. As such, three open curves, an open curve point β_lib-point δ_lib, an open curve point γ_lib-point δ_lib and an open curve point δ_lib-point β_lib-point γ_lib-point ϵ_lib are described by P-type Fourier descriptors, which can represent open curved lines.

<Comparison with Library Using Fourier Descriptors>

With respect to the library candidates narrowed down as described above, Fourier descriptors of the defined three open curves and Fourier descriptors of the intended bones are compared. The Euclidean distance for each of the three Fourier descriptors is obtained.

$$E_n = \sum_{i=1}^{N} (c(k)_{input} - c(k)_{lib})^2 \quad \text{[Formula 19]}$$

N: number of points on contour n stands for the number of the curve and runs from 1 through 3. C(k)input represents Fourier descriptors on the bones to be assessed and C(k)lib represents Fourier descriptors of the library.

However, since Euclidean distances of the three curves are different from each other, they are normalized divided by the minimum value of open curve 1, open curve 2, and open curve 3, respectively. Euclidean distances are defined as E1, E2 and E3 respectively, and the following formula is described:

$$E_{norm} = \frac{E1_n}{E1_{min}} + \frac{E2_n}{E2_{min}} + \frac{E3_n}{E3_{min}} \quad \text{[Formula 20]}$$

Then, the contour of the library in which the normalized Euclidean distance Enorm is minimized, is selected. X and Y angles with respect to the selected contour are represented by X-axis rotation angle θX and Y-axis rotation angle θY at the time when the assessment object was photographed.

With these values, translation amounts in X, Y, Z directions can be determined based on Formula 18, and Z-axis rotation can be represented by θz_f (in the case of femur bone) or θz_t (in the case of ossa cruris). As such, the 3D position (X, Y, Z) and the attitude (θx, θy, θz) can be determined.

<Verification of Estimate Accuracy>

According to the implementation of the above Steps, selection of the angles based on P-type Fourier descriptors was executed by using three curves, line segment 1, line segment 2, and line segment 3. Average errors of 20 examples were 0.75° around X-axis and 1.15° around Y-axis in the case of a femur bone. In the case of an ossa cruris, average errors of 20 examples were 1.05° around X-axis and 0.25° around Y-axis.

TABLE 2

Estimation results of θx and θy in femur bone

| Test No. | Input | | After Estimation | | Error Margin | |
|---|---|---|---|---|---|---|
| | θx | θy | θx | θy | θx | θy |
| 1 | −5 | 5 | −4 | 4 | 1 | 1 |
| 2 | −4 | −4 | −2 | −2 | 2 | 2 |
| 3 | −4 | 2 | −3 | 0 | 1 | 2 |
| 4 | −3 | −5 | −2 | −5 | 1 | 0 |
| 5 | −3 | 3 | −1 | 1 | 2 | 2 |
| 6 | −2 | −4 | −1 | −3 | 1 | 1 |
| 7 | −1 | −2 | −1 | −1 | 0 | 1 |
| 8 | −1 | 0 | −1 | 0 | 0 | 0 |
| 9 | −1 | 5 | −2 | −1 | 1 | 6 |
| 10 | 0 | −3 | 0 | −3 | 0 | 0 |
| 11 | 0 | 3 | 1 | 2 | 1 | 1 |
| 12 | 1 | −5 | −1 | −5 | 2 | 0 |
| 13 | 1 | 0 | 1 | 0 | 0 | 0 |
| 14 | 2 | 1 | 1 | 2 | 1 | 1 |
| 15 | 2 | 4 | 2 | 4 | 0 | 0 |
| 16 | 3 | 0 | 3 | 0 | 0 | 0 |
| 17 | 3 | 5 | 3 | 1 | 0 | 4 |
| 18 | 4 | −2 | 3 | −3 | 1 | 1 |
| 19 | 4 | 0 | 4 | −1 | 0 | 1 |
| 20 | 5 | −5 | 4 | −5 | 1 | 0 |
| Average of error margin | | | | | 0.75 | 1.15 |

TABLE 3

Estimation results of θx and θy in ossa cruris

| Test No. | Input | | After Estimation | | Error Margin | |
|---|---|---|---|---|---|---|
| | θx | θy | θx | θy | θx | θy |
| 1 | −5 | −4 | −5 | −4 | 0 | 0 |
| 2 | −5 | 0 | −5 | −1 | 0 | 1 |
| 3 | −4 | 0 | −4 | 0 | 0 | 0 |
| 4 | −4 | 5 | −4 | 5 | 0 | 0 |
| 5 | −3 | −5 | 2 | −4 | 5 | 1 |
| 6 | −3 | 1 | −4 | 1 | 1 | 0 |
| 7 | −2 | −5 | −2 | −5 | 0 | 0 |
| 8 | −2 | 3 | −4 | 2 | 2 | 1 |
| 9 | −1 | −2 | −1 | −2 | 0 | 0 |
| 10 | −1 | 4 | 1 | 4 | 2 | 0 |
| 11 | 0 | 1 | −1 | 1 | 1 | 0 |
| 12 | 1 | −5 | 0 | −5 | 1 | 0 |
| 13 | 1 | 0 | 0 | 0 | 1 | 0 |
| 14 | 2 | −4 | 2 | −4 | 0 | 0 |
| 15 | 3 | 0 | 4 | 0 | 1 | 0 |
| 16 | 4 | −5 | 3 | −5 | 1 | 0 |
| 17 | 4 | 5 | 4 | 5 | 0 | 0 |
| 18 | 5 | 0 | 5 | 0 | 0 | 0 |
| 19 | 5 | 3 | 1 | 2 | 4 | 1 |
| 20 | 0 | 0 | 2 | 1 | 2 | 1 |
| Average of error margin | | | | | 1.05 | 0.25 |

<Actual Image Processing>

A coordinate system is defined on the image with respect to a knee joint X-ray image as shown in FIG. 25. Usually, the femur bone is located at the top of the screen. Thus, the screen is scanned from the upper left, and a first point of brightness above a certain level is recognized as the contour line of the femur bone. The contour line is traced from this point as the origin.

Figure 33:
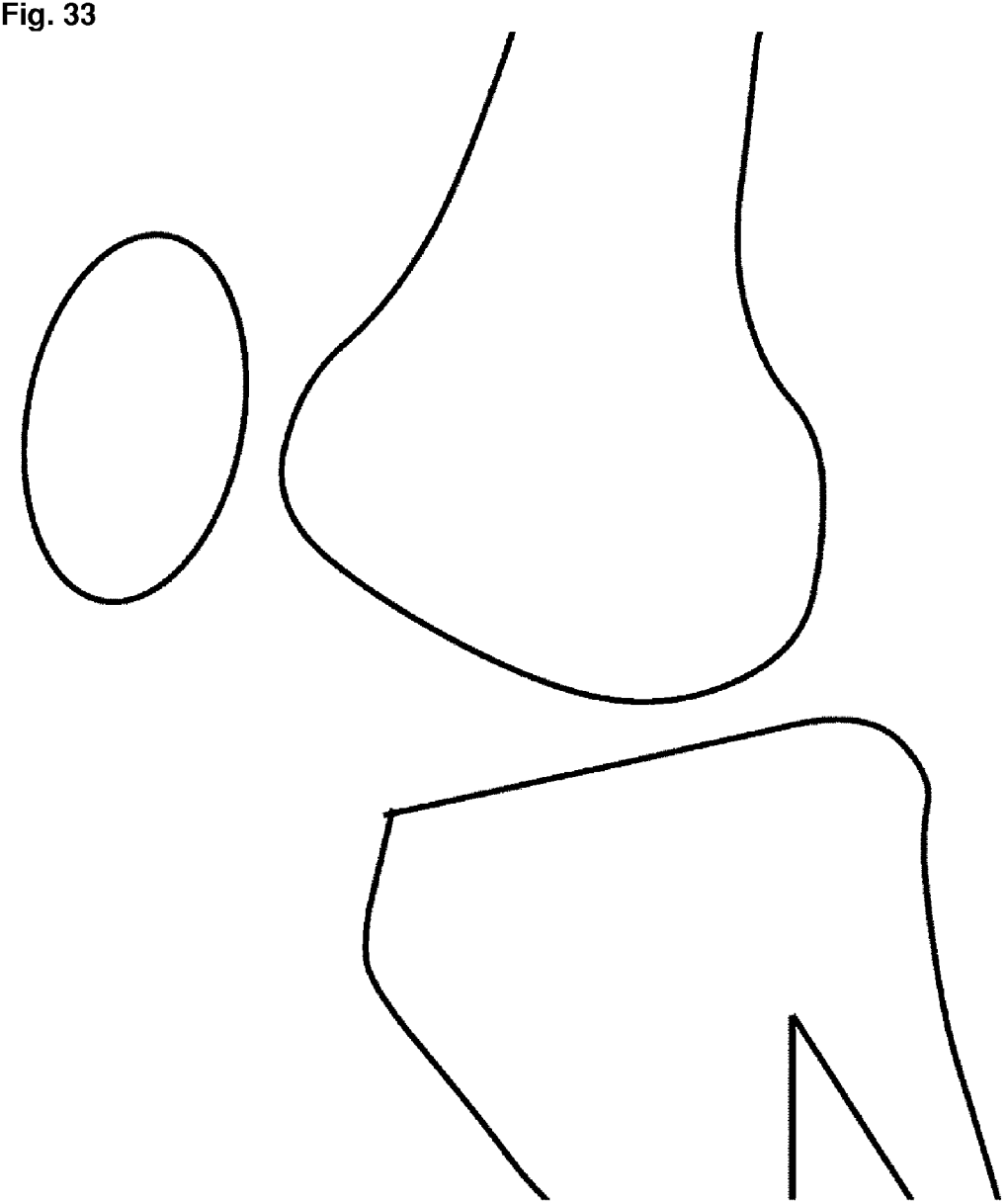
FIG. 33 is a frame format of the positions of each bone.
Figure 34:
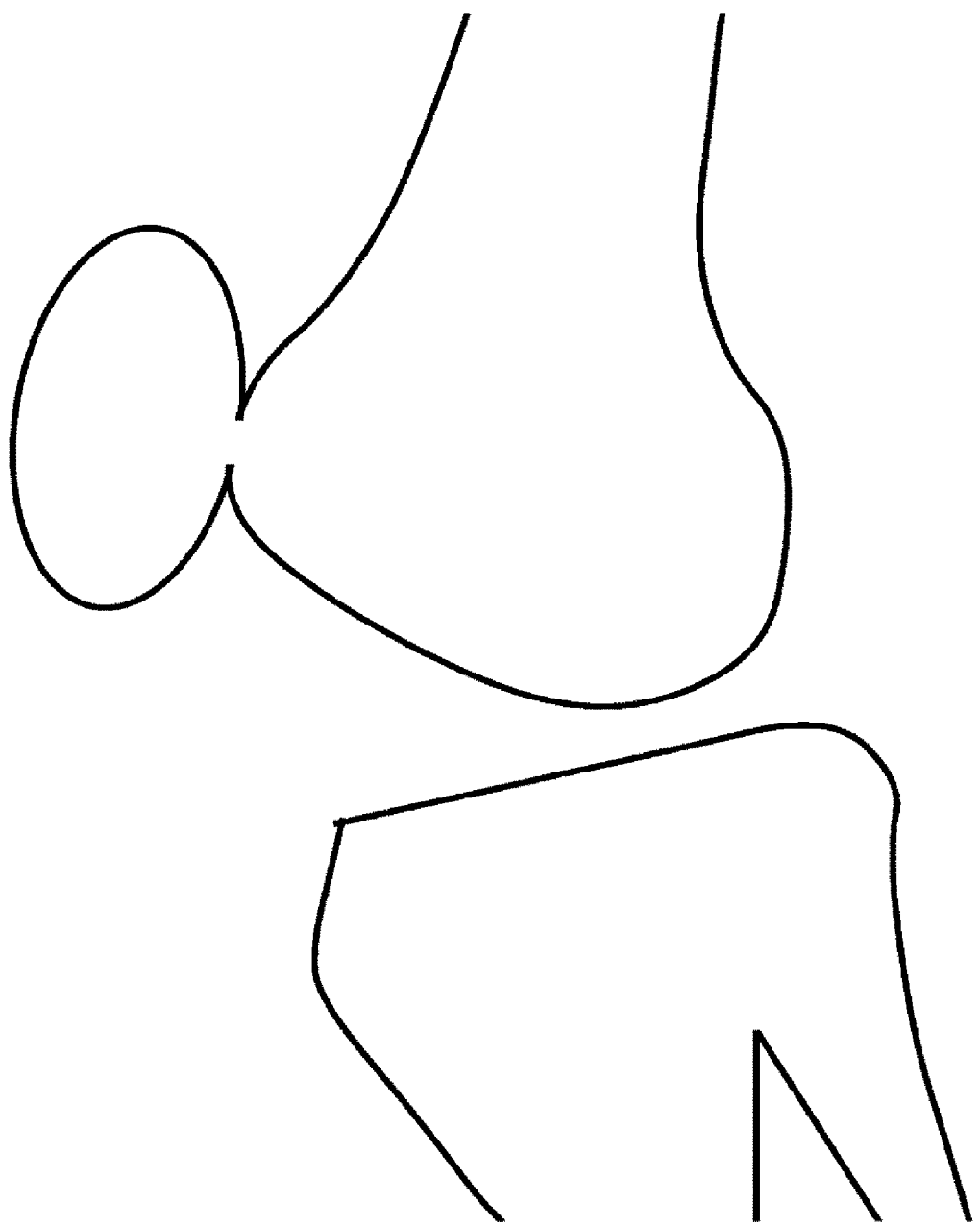
FIG. 34 is a frame format of the positions of each bone.
Figure 35:
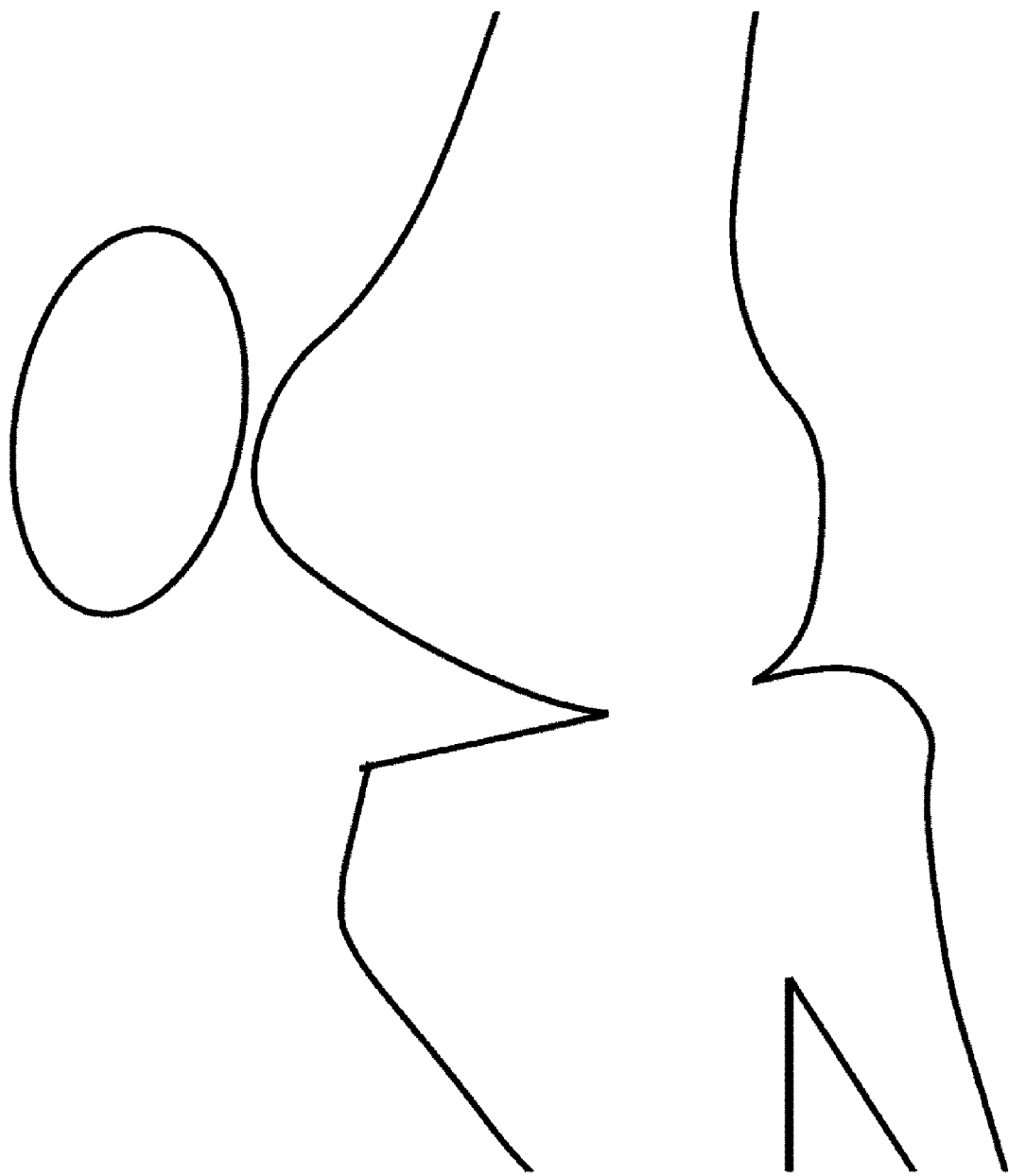
FIG. 35 is a frame format of the positions of each bone.
Figure 36:
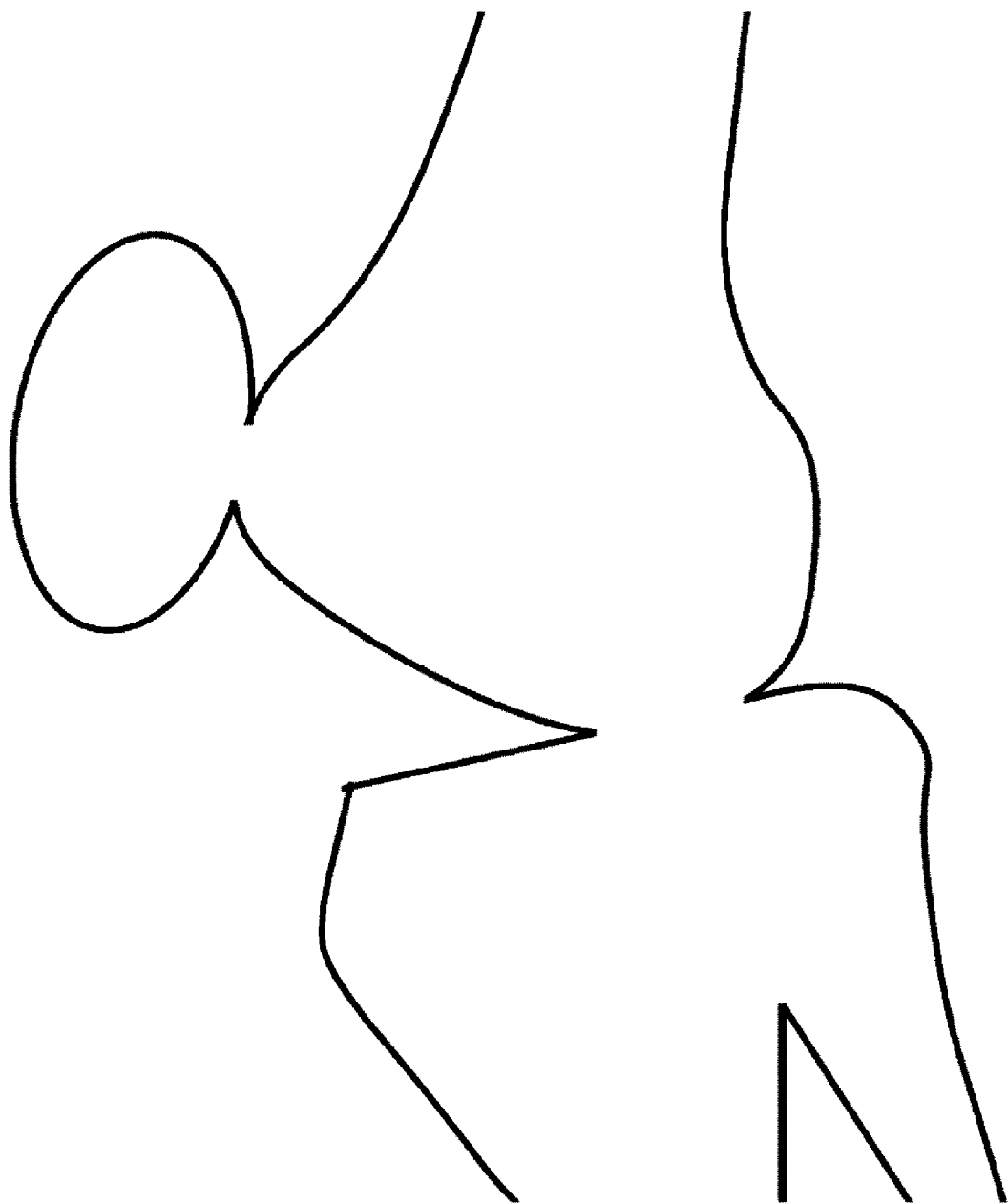
FIG. 36 is a frame format of the positions of each bone.

A knee joint may be in the following four conditions:
Condition (1): a femur bone, a patella and an ossa cruris are all separated (FIG. 33).
Condition (2): a femur bone and an ossa cruris are separated, while the femur bone and a patella are not separated (FIG. 34).
Condition (3): a femur bone and a patella are separated, while the femur bone and ossa cruris are not separated (FIG. 35).
Condition (4): a femur bone and a patella are not separated, and the femur bone and an ossa cruris are not separated (FIG. 36).

In condition (1), the contour tracing is completed when the Y coordinate value coincides with that of the origin. In condition (3), the contour tracing is completed when the Y coordinate value becomes zero. In condition (2), the value of Y coordinate increases and then decreases during contour tracing. Further, the Y coordinate value slightly increases and then decreases again. After that, the contour tracing is completed when the Y coordinate value finally coincides with the origin. In condition (4), while the contour tracing is partway the same as condition (2), it is finally completed when the value of Y coordinate becomes zero. With an implementation of the contour tracing as described above, the overlapping conditions of bones constituting a knee joint are determined.

However, although the separation of bones can be determined if they are deeply overlapped, it is difficult to determine the separation of bones when they are contacted or not sufficiently overlapped. When bones are not separated (in a state of contact or overlap), there is a possibility that contour lines belonging to a bone cannot be clearly determined as shown in FIG. 26. In particular, such a difficulty arises when bones are contacted or slightly overlapped. Without emphasis on the problem, only contours that are thought to be contours of roughly intended bones are extracted, and thus the primary feature point α_f (α_t in the case of ossa cruris) is extracted by using the above contours based on the above method. As described above, even if the contour lines extracted in the region where bones are slightly overlapped or contacted are not clear, the position of the primary feature point is hardly changed.

Further, with regard to the patella, a pair of points are selected so that the distance between the points is the longest in the contours of the patella, and an auxiliary line p connecting these two points is defined. The auxiliary line p is parallel translated and defined as a dotted line A_p when it contacts the patella at a single point, and thus the point on the patella contour line, which the dotted line A_p contacts, is defined as the primary feature point. The primary feature point of the patella is called point α_p.

Figure 37:
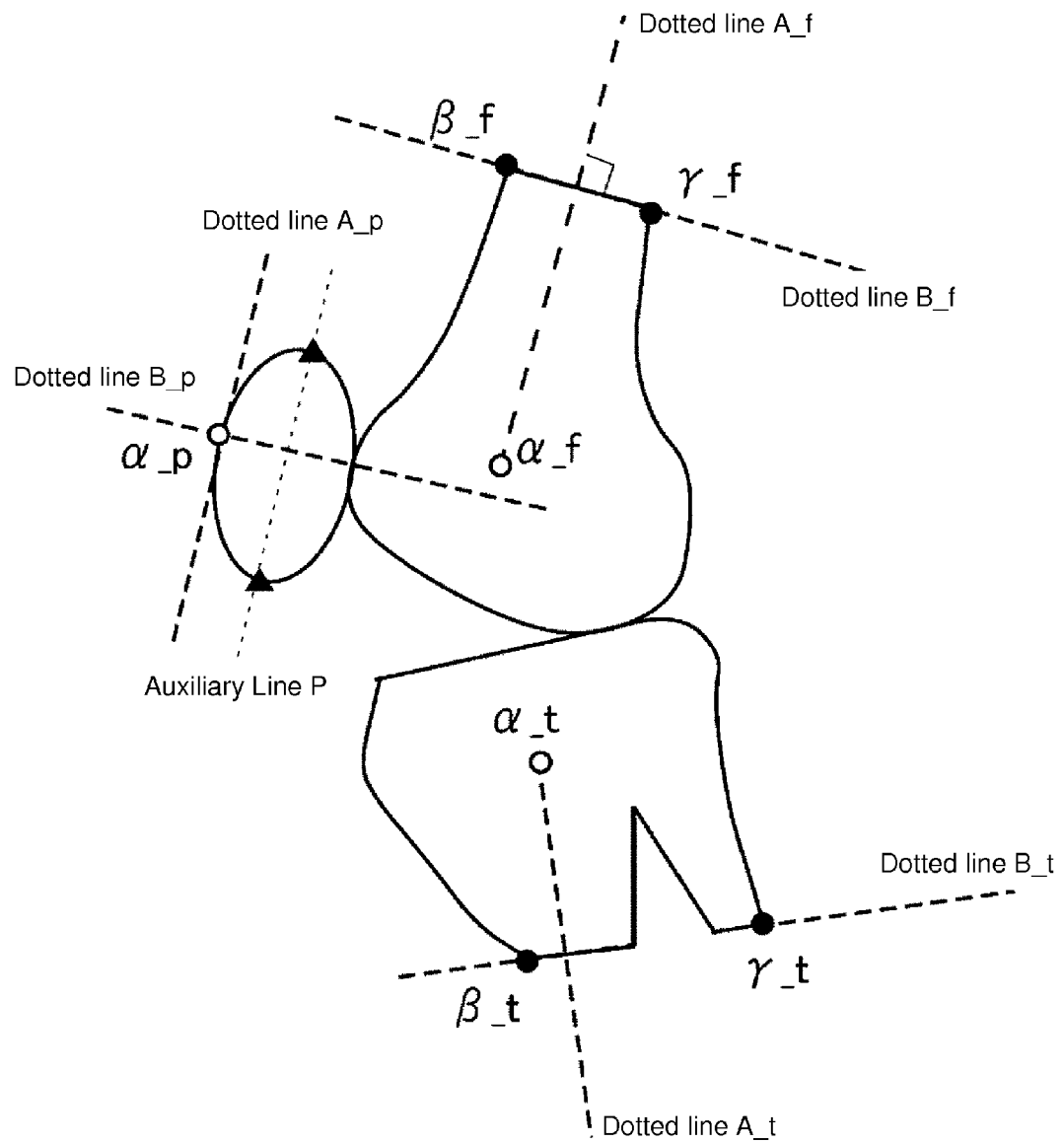
FIG. 37 is a view illustrating preparatory procedures for definition of cancel lines.

According to the above Steps 1 to Step 2, a dotted line A_f, a dotted line B_f, a dotted line A_t and a dotted line B_t are defined for the femur bone and the ossa cruris. Further, with regard to the patella, a dotted line B_p is defined so as to pass through the primary feature point α_p orthogonally to the dotted line A_p. FIG. 37 shows the above relationship. In FIG. 37, the secondary feature points, point β and point γ, defined with regard to the femur bone and the ossa cruris, are shown.

Figure 38:
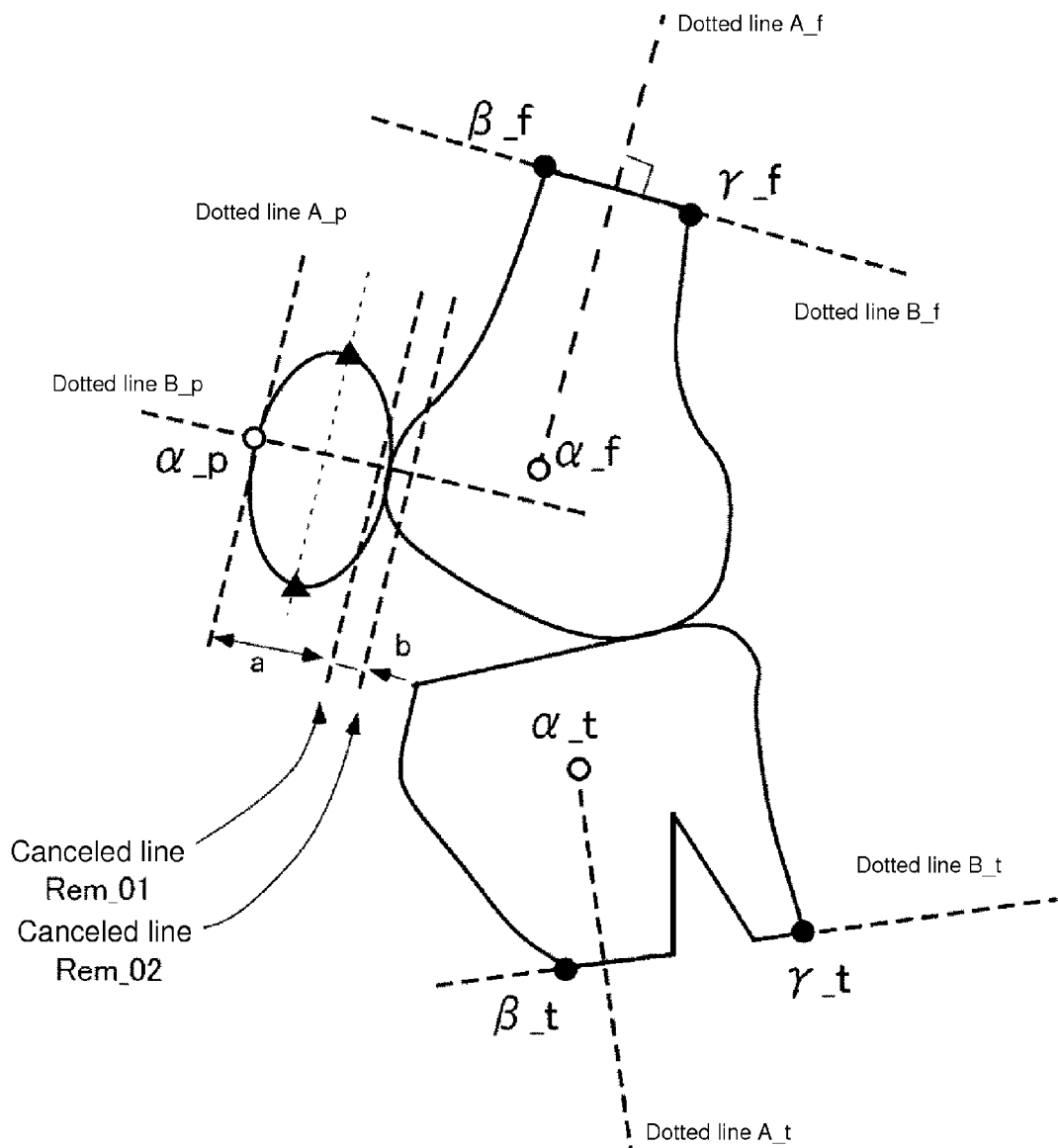
FIG. 38 is a view illustrating cancel lines.

Cancel line Rem_01 is drawn orthogonally to the dotted line B_p at a predetermined distance of a from the primary feature point α_p of the patella along the dotted line B_p toward the primary feature point α_f of the femur bone. Cancel line Rem_02 is drawn at a distance of b further from cancel line Rem_01. FIG. 38 shows the results of the implementation of the above processing. Here, distance a is preferably arranged so as to be 30% to 100% of the maximum length of the patella (the distance between the triangle points shown in FIG. 38). Cancel line Rem_01 is required to cross the contour of the patella.

Distance b is preferably arranged such that the cancel line Rem_02 crosses the contour line of the femur bone and is preferably arranged to be 3% to 50% of distance a.

Figure 39:
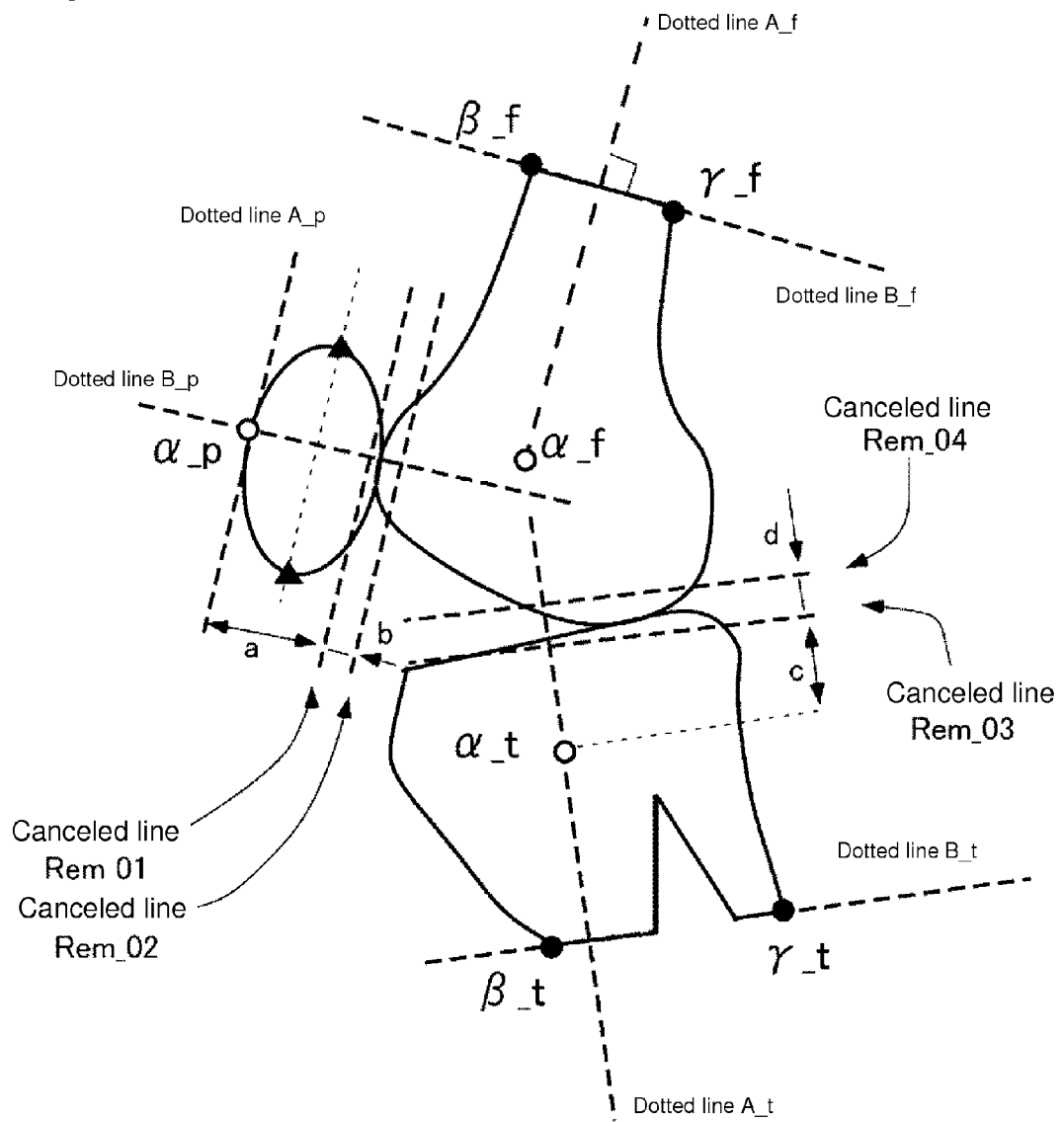
FIG. 39 is a view illustrating cancel lines.

Next, cancel line Rem_03 is drawn orthogonally to dotted line A_t at a predetermined distance c from primary feature point α_t of the ossa cruris along dotted line A_t toward primary feature point α_f of the femur bone. Cancel line Rem_04 is drawn at a distance d further from cancel line Rem_03. FIG. 39 shows the results of the implementation of the above processing.

Here, cancel line Rem_03 is required to cross the contour of the ossa cruris. Distance c is preferably arranged to be 50% to 200% of the maximum length of the patella. Further, distance c, if defined by multiplying a distance between the secondary feature points of the ossa cruris by a fixed ratio, can be properly and preferably arranged for patients whose patella and ossa cruris are far from the average in size.

Distance d is preferably arranged such that the cancel line Rem_04 crosses the contour line of the femur bone and is preferably arranged to be 5% to 50% of distance c.

Figure 40:
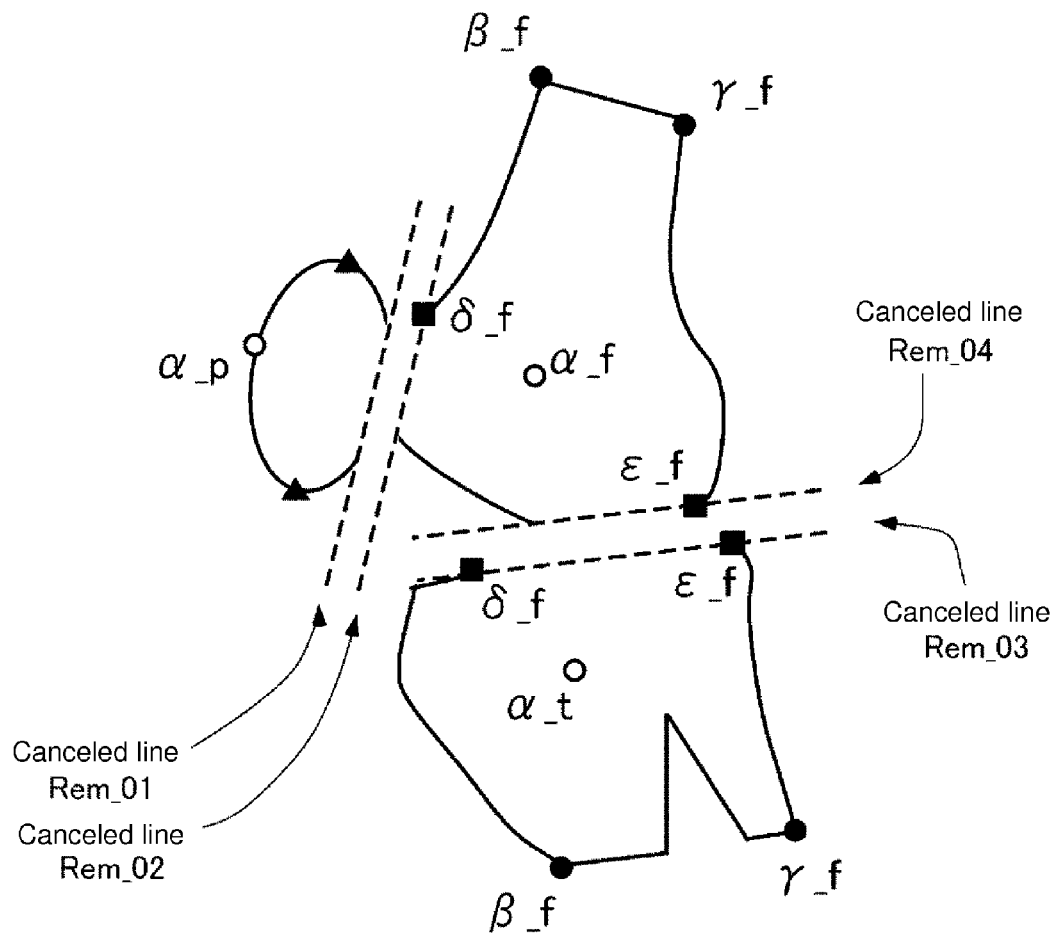
FIG. 40 is a view illustrating the third feature points defined by cancel lines.

Although cancel lines are straight lines according to the present Embodiment, curved lines such as arc, etc. allow arranging more proper cancel regions when applied to a hip joint. Accordingly, proper curved lines are preferably selected depending on the shape of the joint. With regard to femur bone and ossa cruris, the edge points of the contour lines canceled by cancel lines are defied as the third feature points by the method as described before (see FIG. 40).

Figure 41:
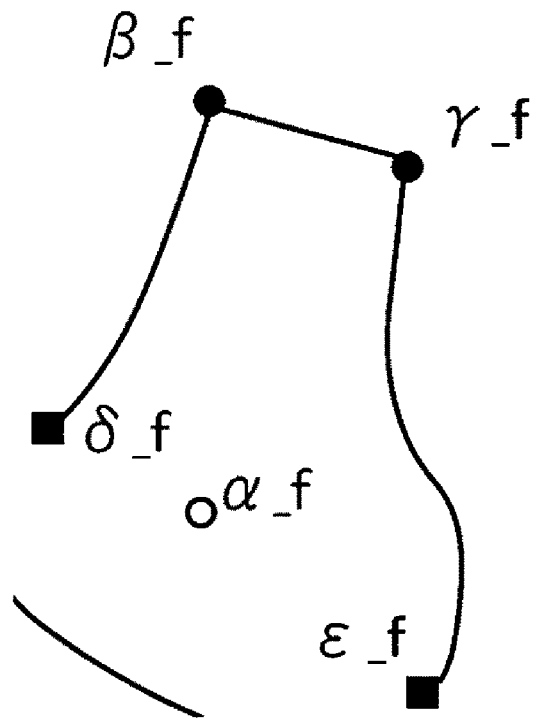
FIG. 41 is a view illustrating a femur bone and an ossa cruris with feature points that are extracted up to the third feature points.
Figure 41:
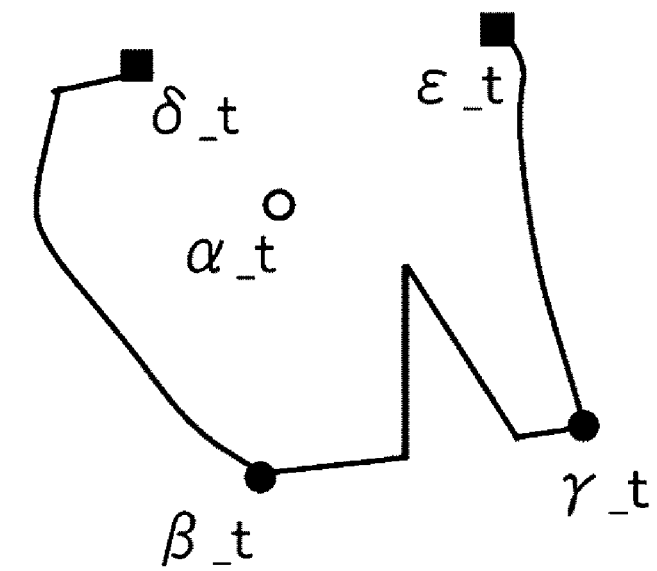

Accordingly, with regard to femur bone and ossa cruris, the primary feature point, the secondary feature point and the third feature point can be defined (see FIG. 41). Further, according to the method described above, X-axis rotation angle θX, Y-axis rotation angle θY, as well as θz and position (X, Y, Z) can be determined.

With regard to patella, if the triangle points are defined as the secondary feature points and the edge points of the contour line canceled by cancel line Rem_01 are defined as the third feature points, the 3D position and attitude can be determined by using the method of Embodiment 1.

<Bending Angle of Knee Joint and 3D Position and Attitude of Each Bone>

Figure 42:
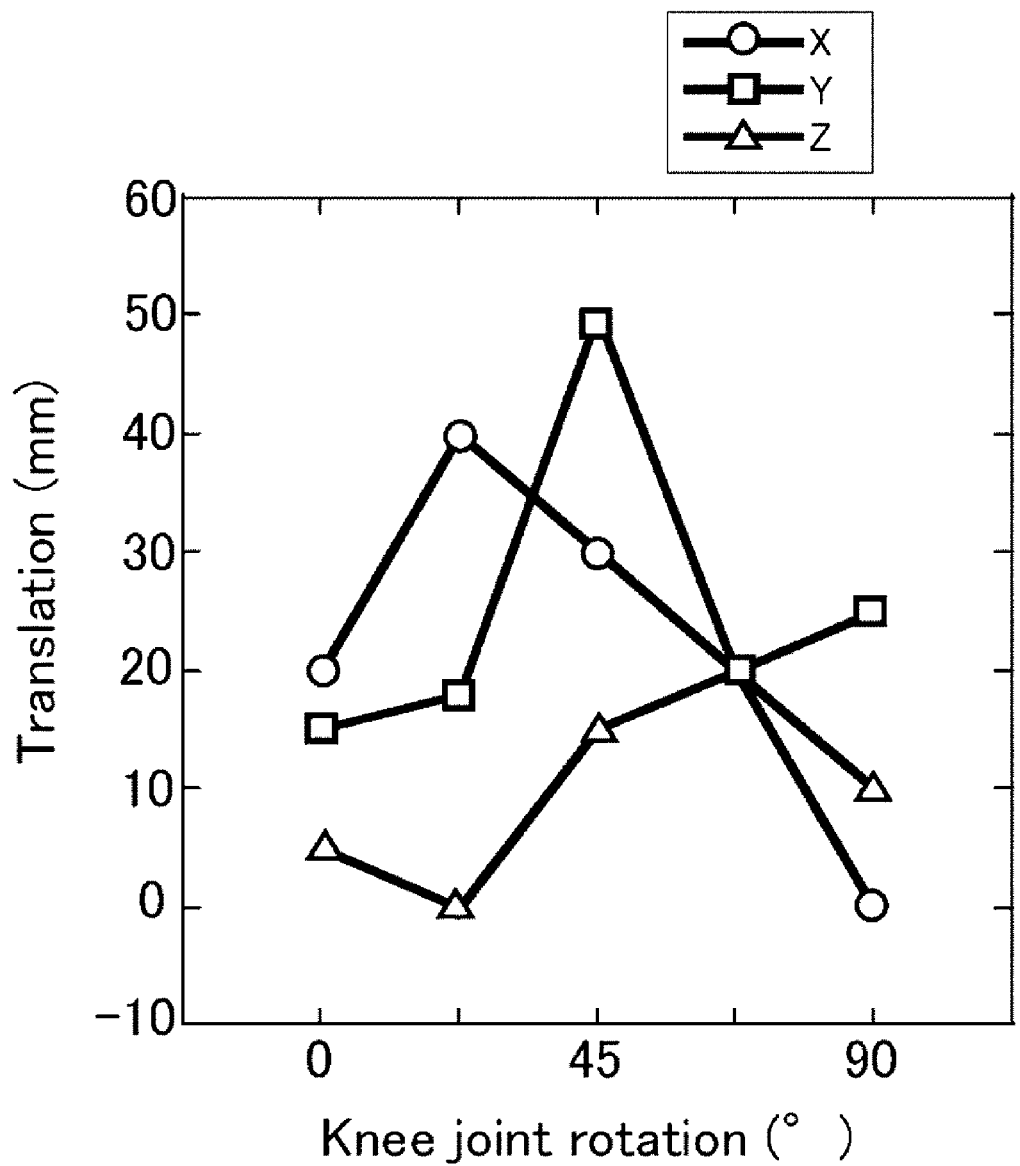
FIG. 42 is a view illustrating positional relation between the knee bending angle (knee joint rotation angle) and the position (translation) of a femur bone.
Figure 43:
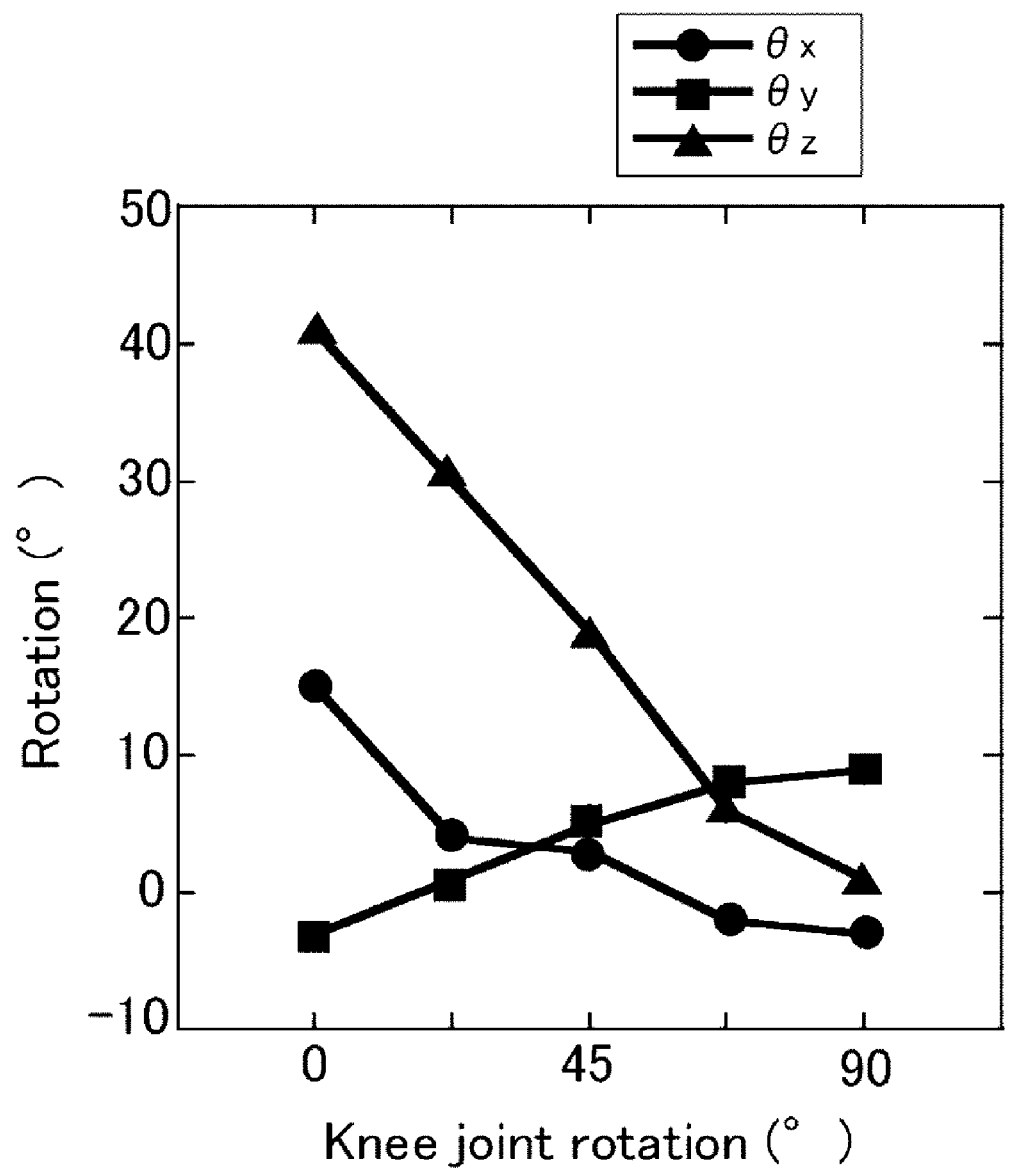
FIG. 43 is a view illustrating a relationship between the knee bending angle (knee joint rotation angle) and the attitude (rotation) of a femur bone.
Figure 44:
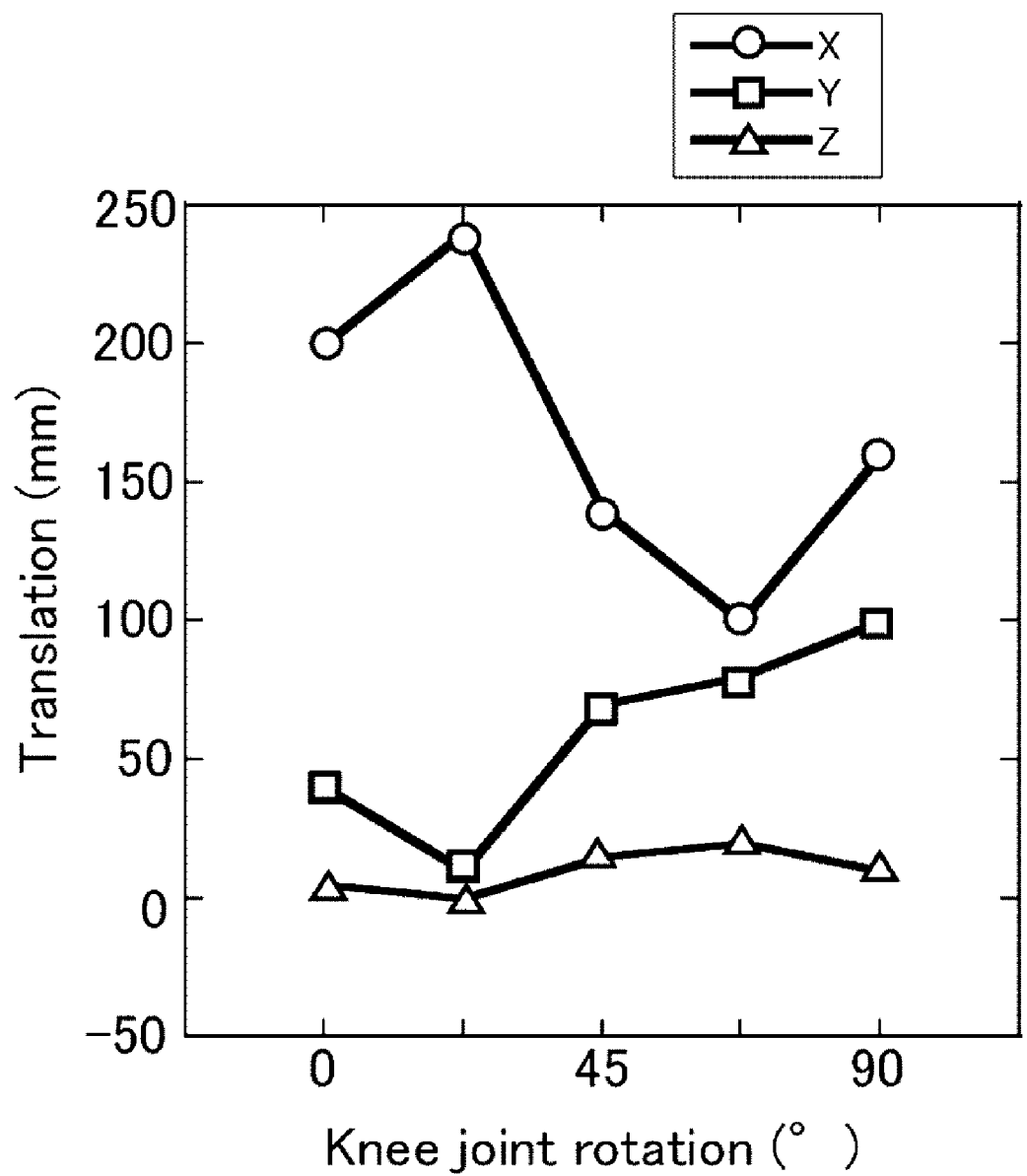
FIG. 44 is a view illustrating a relationship between the knee bending angle (knee joint rotation angle) and the position (translation) of an ossa cruris.
Figure 45:
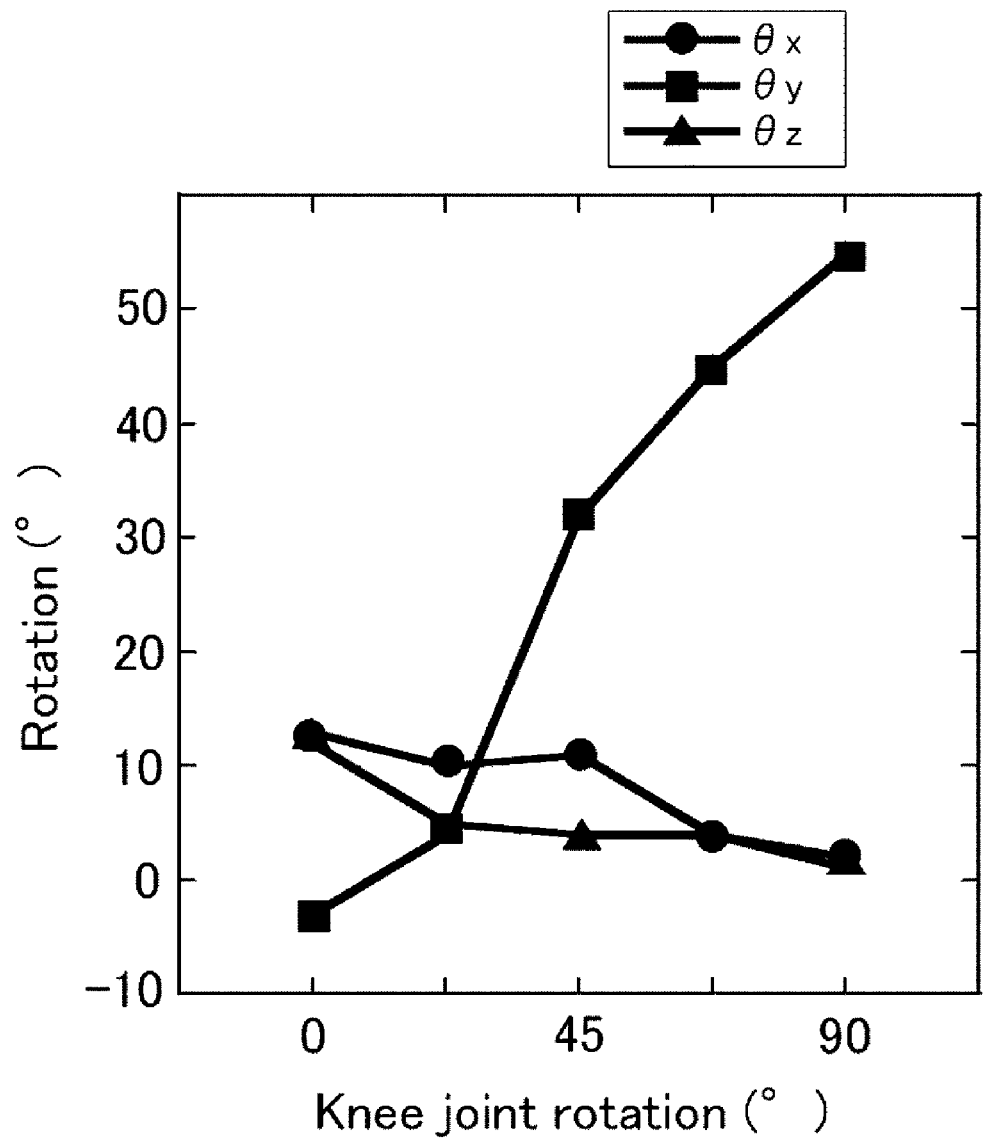
FIG. 45 is a view illustrating a relationship between the knee bending angle (knee joint rotation angle) and the attitude (rotation) of an ossa cruris.
Figure 46:
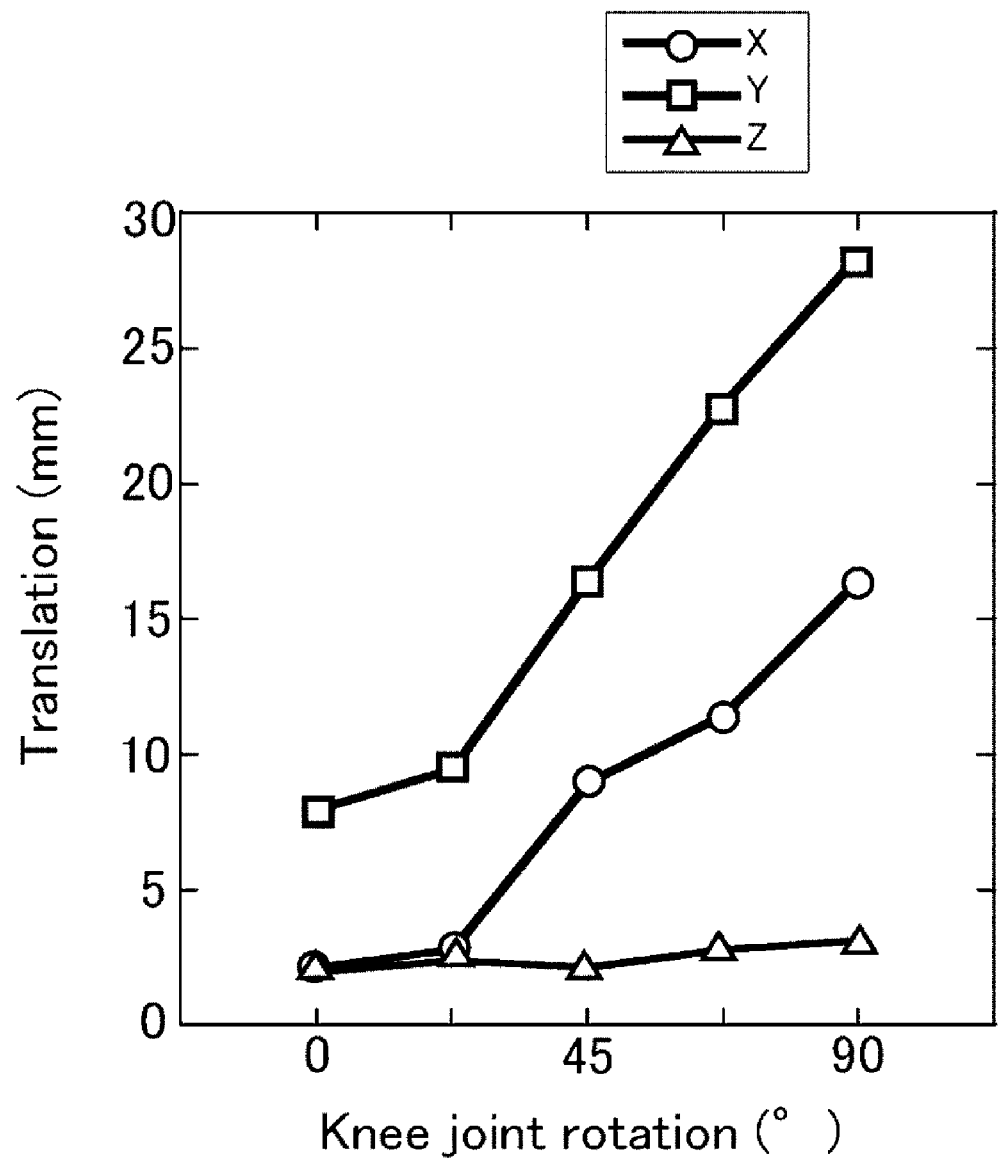
FIG. 46 is a view illustrating a relationship between the knee bending angle (knee joint rotation angle) and the position (translation) of a patella.
Figure 47:
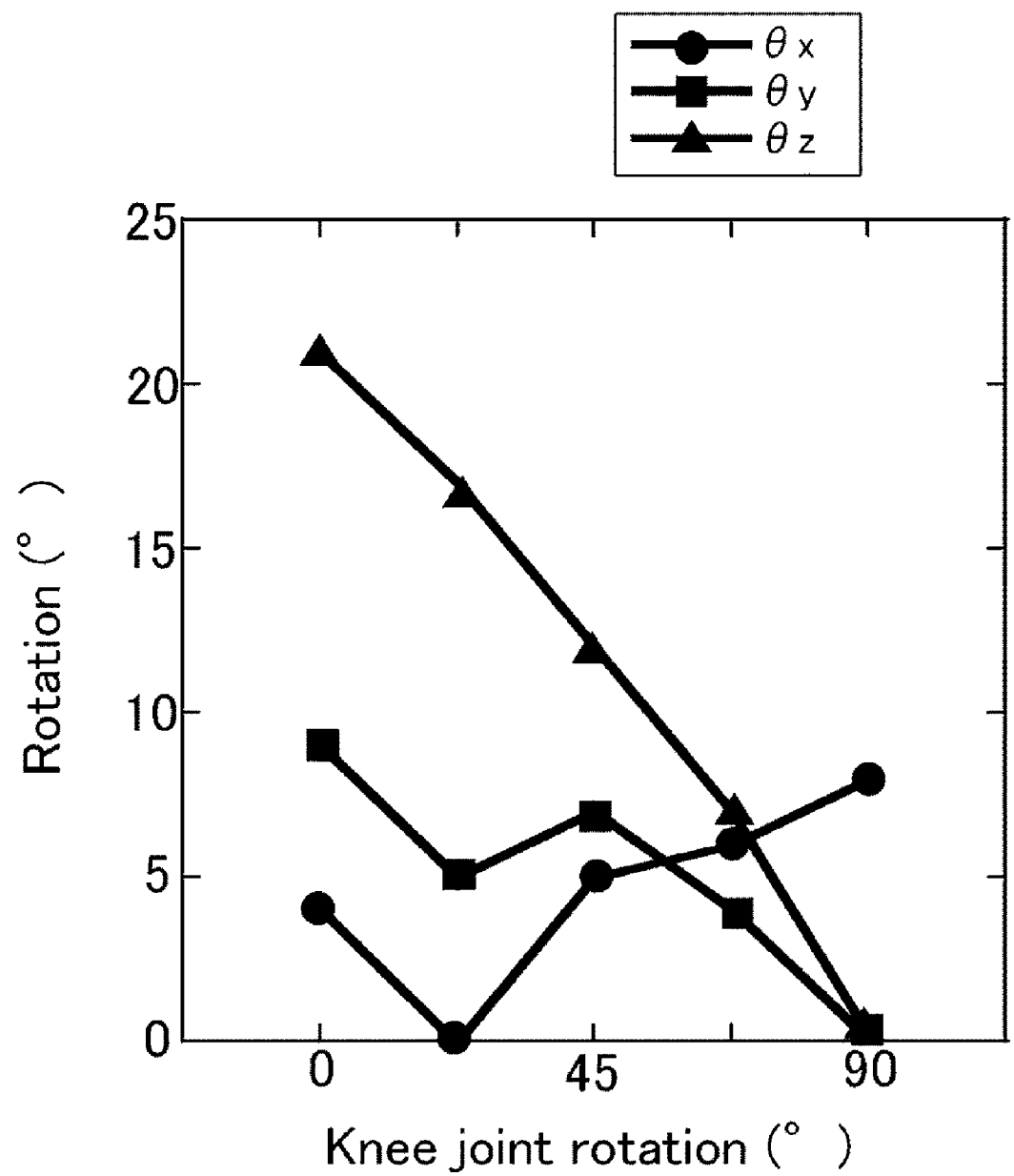
FIG. 47 is a view illustrating a relationship between the knee bending angle (knee joint rotation angle) and the attitude (rotation) of a patella.

According to the above method, the 3D position and attitude of each bone was examined by using an X-ray image of knee joint of a normal subject. Results are shown in FIG. 42 to FIG. 47. FIG. 42 and FIG. 43 show translation (X, Y, Z) and attitude (θx, θy, θz) of a femur bone. FIG. 44 and FIG. 45 show translation (X, Y, Z) and attitude (θx, θy, θz) of an ossa cruris. FIG. 46 and FIG. 47 show translation (X, Y, Z) and attitude (θx, θy, θz) of a patella.

Embodiment 3

In Embodiments 1 and 2, when candidates are narrowed down from the contour group in a library, vectors connecting feature points and start and end points are obtained, and the contours of the measuring object and library candidates are compared. However, vectors are not necessarily used, and comparing these relative relations (relative position, relative direction, etc.) may be compared to achieve the same results.

Figure 48:
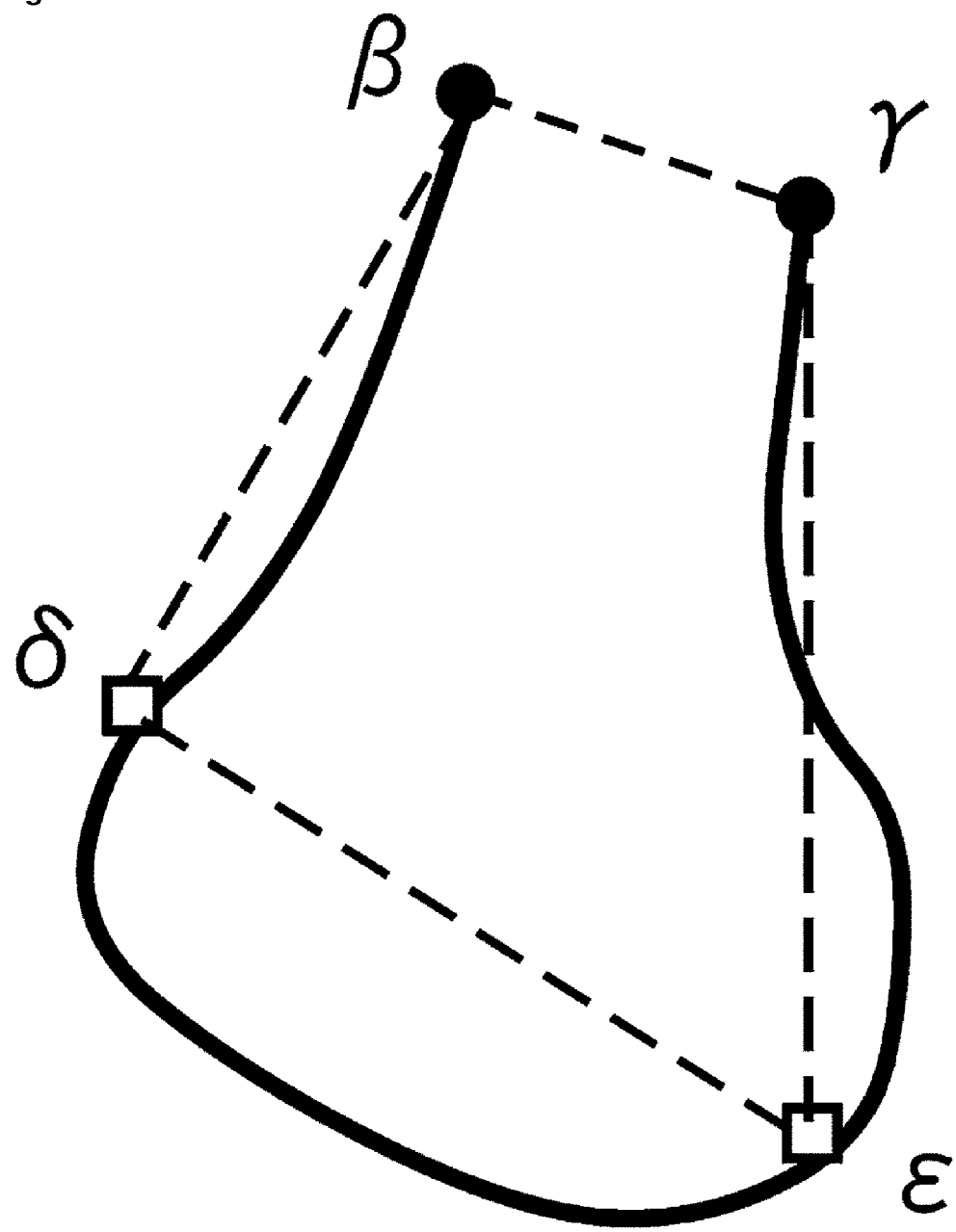
FIG. 48 is a view illustrating relative relations between feature points and a start point and an end point.
Figure 49:
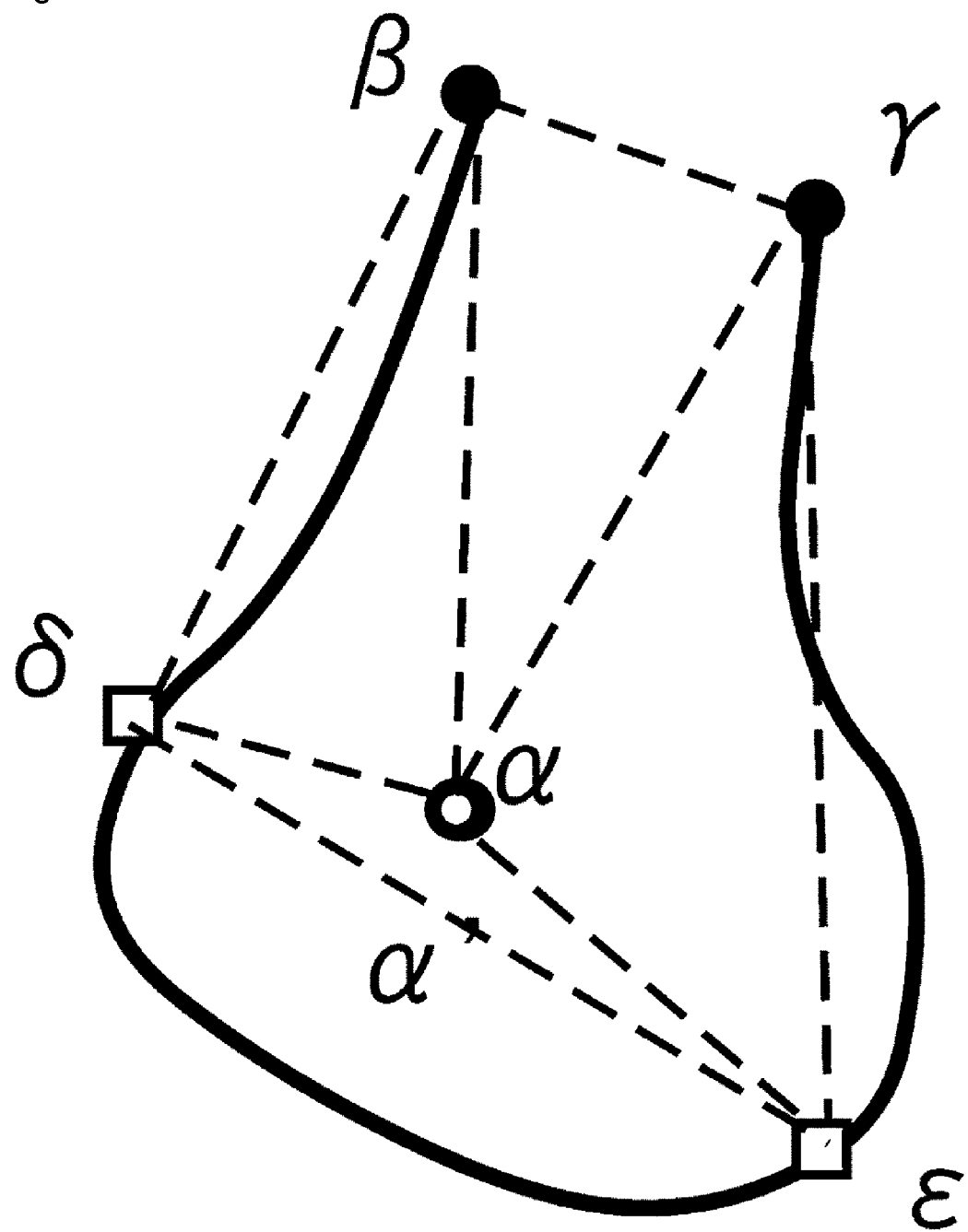
FIG. 49 is a view illustrating relative relations between feature points and a start point and an end point.

FIG. 48 and FIG. 49 show an example of relative relations. Each dotted line in the drawings shows relative relations.

Although an example according to an embodiment of the present invention is described hereinbefore, the present invention is not limited to this example. Various modifications can be made without departing from the scope of the invention.

Generally, bones are objects with little features, however, neighborhood of a joint is characteristically made up of comparatively complex curved surfaces. According to the present invention, it was found that even for such curved surfaces a clinically required accuracy can be achieved without using all of them. As such, in the case that which bone a contour belongs to is not clear due to overlapped bones, canceling the contour does not have material effect on accuracy.

Overlapped bones frequently make unclear to which bone a contour belongs when photographing with a device with poor accuracy of photography. According to the present invention, sufficient accuracy can be secured with such devices.

What is claimed is:

1. An X-ray image processing method of estimating a position and attitude of an measuring object by comparing the measuring object on an X-ray projection image with a parent database storing data of a plurality of candidate objects, wherein
   said measuring object is an artificial joint bone or a bone of living tissue, and the 3D shape of said candidate object is known,
   said parent database stores an element-contour group of said plurality of candidate objects projected on 2D plane from various angles,
   a part of a contour of said measuring object is deficient, said method comprising:
   a step of calculating a start point and an end point of the contour other than the deficient part of said measuring object;
   a step of estimating a start point and an end point of each element-contour of said element-contour group corresponding to the start point and the end point of the contour of said measuring object;
   a step of estimating an element-contour corresponding to the contour of said measuring object and a candidate object corresponding to said measuring object by comparing a coefficient of open curve Fourier descriptors calculated from the contour, said start point and end point of said measuring object with a coefficient of open curve Fourier descriptors calculated from the contour, said start point and end point of each element-contour of said element-contour group; and
   a step of calculating a position and attitude of said measuring object based on the element-contour corresponding to the contour of said measuring object and the candidate object corresponding to said measuring object.

2. The X-ray image processing method according to claim 1, further comprising a step of eliminating from said element-contour group an element-contour with element-contour relative relations significantly different from measuring-object relative relations, by comparing said measuring-object relative relations for a plurality of feature points of measuring object with said element-contour relative relations for a plurality of feature points of element-contours, based on a plurality of said measuring-object feature points introduced from the feature of contour of said measuring object and a plurality of said element-contour feature points introduced from the feature of each element-contour of said element-contour group, corresponding to said measuring-object feature points before said step of estimating the start point and the end point is implemented.

3. The X-ray image processing method according to claim 2, wherein at least one of said plurality of measuring-object feature points and said plurality of element-contour feature points is the most distant point from the longest axis of a contour that are obtained with respect to the contour of said measuring object and each element-contour of said element-contour group.

4. The X-ray image processing method according to claim 2, wherein at least one of said plurality of measuring-object feature points and said plurality of element-contour feature points is on a skeletal line produced by skeletalization process that is applied to the contour of said measuring object and each element-contour of said element contour group.

5. The X-ray image processing method according to claim 2, wherein said plurality of measuring-object feature points include at least said start point and end point of contour, and said measuring-object relative relation is represented by a vector connecting one of said plurality of measuring-object feature points and said start point and end point.

6. The X-ray image processing method according to claim 1, wherein an element-contour corresponding to a contour of said measuring object and a candidate object corresponding to said measuring object is estimated by obtaining a plurality of open curved lines including as a start point and en end point any of a plurality of points on the contour of said measuring object and on each element-contour of said element-contour group, and comparing coefficients of Fourier descriptors of said plurality of open curved lines.

7. The X-ray image processing method according to claim 1, wherein a part or whole of said each step is implemented in a remote location accessible via network.

8. The X-ray image processing method according to claim 1, wherein a contour of said measuring object includes two or more deficient parts, said method further comprising,
  a step of generating an open curved line with a start point and an end point by filling the gap of said deficient part and defining the curved line as a new contour of the measuring object.

9. The X-ray image processing method according to claim 1, wherein at least one of the deficient parts of contour of said measuring object is a part eliminated due to proximity to other bones from the contour of said measuring object or a part outside of said X-ray projection image.

10. An X-ray image processing system for estimating a position and attitude of an measuring object by comparing the measuring object on an X-ray projection image with a parent database storing data of a plurality of candidate objects, wherein
  said measuring object is an artificial joint bone or a bone of living tissue, the 3D shape of said candidate object is known,
  said parent database stores an element-contour group of said plurality of candidate objects projected on 2D plane from various angles,
  said system, comprising:
  means for estimating an element-contour corresponding to the contour of said measuring object and a candidate object corresponding to said measuring object by comparing a coefficient of open curve Fourier descriptors of contour of said measuring object with a coefficient of open curve Fourier descriptors of each element-contour of said element-contour group; and
  means for calculating a position and attitude of said measuring object based on the element-contour corresponding to the contour of said measuring object and the candidate object corresponding to said measuring object.

11. The X-ray image processing system according to claim 10, wherein a part or whole of database and computing means is provided in a remote location accessible via network.

* * * * *